(12) United States Patent
Aiba et al.

(10) Patent No.: US 8,693,427 B2
(45) Date of Patent: *Apr. 8, 2014

(54) MOBILE COMMUNICATION SYSTEM, BASE STATION APPARATUS, AND MOBILE STATION APPARATUS

(71) Applicant: Sharp Kabushiki Kaisha, Osaka (JP)

(72) Inventors: Tatsushi Aiba, Osaka (JP); Shohei Yamada, Osaka (JP); Hiroshi Katsuragawa, Osaka (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/672,656

(22) Filed: Nov. 8, 2012

(65) Prior Publication Data

US 2013/0064206 A1 Mar. 14, 2013

Related U.S. Application Data

(62) Division of application No. 12/555,555, filed on Sep. 8, 2009, now Pat. No. 8,311,004, which is a division of application No. 12/529,152, filed as application No. PCT/JP2008/060453 on Jun. 6, 2008, now Pat. No. 8,064,922.

(30) Foreign Application Priority Data

Jun. 8, 2007 (JP) .................. 2007-152560

(51) Int. Cl.
*H04W 72/08* (2009.01)
(52) U.S. Cl.
USPC ........................................ 370/329
(58) Field of Classification Search
USPC ........................ 370/310, 328, 329
See application file for complete search history.

(56) References Cited

U.S. PATENT DOCUMENTS 6,871,066 B1 3/2005 Khullar et al.
(Continued)

FOREIGN PATENT DOCUMENTS

| CN | 101002440 A | 7/2007 |
|---|---|---|
| EP | 1526674 A1 | 4/2005 |

(Continued)

OTHER PUBLICATIONS

3GPP TS 36.213 V1.2.0 (May 2007), 3rd Generation Partnership Project; Technical Specification Group Radio Access Network; Physical layer Procedures (Release 8).

(Continued)

*Primary Examiner* — Chi Pham
*Assistant Examiner* — Robert Lopata
(74) *Attorney, Agent, or Firm* — Birch, Stewart, Kolasch & Birch, LLP

(57) ABSTRACT

A mobile communication system in which a mobile station apparatus transmits, to a base station apparatus, uplink data using a physical uplink shared channel assigned by an uplink data transmission permission signal, wherein the base station apparatus: transmits, to the mobile station apparatus, a radio resource control signal including information for specifying a physical format in transmitting reception quality information together with uplink data; and transmits, to the mobile station apparatus, the uplink data transmission permission signal including a transmission instruction of reception quality information, and wherein the mobile station apparatus transmits, to the base station apparatus, reception quality information together with uplink data using the physical uplink shared channel according to information for specifying the physical format in case that a transmission instruction of the reception quality information is included in the uplink data transmission permission signal.

6 Claims, 18 Drawing Sheets

(56) References Cited

U.S. PATENT DOCUMENTS

| | | | |
|---|---|---|---|
| 6,993,294 B2 | 1/2006 | Nobukiyo et al. | |
| 7,050,824 B2 | 5/2006 | Masseroni et al. | |
| 7,328,019 B2 | 2/2008 | Nishikawa et al. | |
| 7,352,709 B2 | 4/2008 | Wakabayashi | |
| 7,406,314 B2* | 7/2008 | Sharma | 455/445 |
| 7,417,964 B2 | 8/2008 | Cho et al. | |
| 7,586,834 B2 | 9/2009 | Byun et al. | |
| 7,599,319 B2 | 10/2009 | Kondou et al. | |
| 7,616,596 B2 | 11/2009 | Lee et al. | |
| 7,616,610 B2* | 11/2009 | Kuchibhotla et al. | 370/335 |
| 7,680,508 B2 | 3/2010 | Liljestrom et al. | |
| 7,693,170 B2 | 4/2010 | Usuda et al. | |
| 7,738,901 B2 | 6/2010 | Tsai et al. | |
| 7,778,599 B2 | 8/2010 | Li et al. | |
| 7,809,373 B2 | 10/2010 | Park et al. | |
| 7,813,291 B2 | 10/2010 | Yoon et al. | |
| 7,817,605 B2 | 10/2010 | Liu | |
| 7,826,859 B2 | 11/2010 | Lee et al. | |
| 7,986,959 B2 | 7/2011 | Malladi et al. | |
| 8,054,767 B2 | 11/2011 | Choi et al. | |
| 8,064,917 B2 | 11/2011 | Aiba et al. | |
| 8,064,918 B2 | 11/2011 | Aiba et al. | |
| 8,064,922 B2 | 11/2011 | Aiba et al. | |
| 8,103,297 B2 | 1/2012 | Aiba et al. | |
| 8,107,418 B2 | 1/2012 | Oh | |
| 8,116,256 B2* | 2/2012 | Zhu et al. | 370/324 |
| 8,140,021 B2 | 3/2012 | Aiba et al. | |
| 8,248,924 B2* | 8/2012 | Lee et al. | 370/229 |
| 2001/0043576 A1 | 11/2001 | Terry | |
| 2003/0073409 A1 | 4/2003 | Nobukiyo et al. | |
| 2004/0043783 A1 | 3/2004 | Anderson | |
| 2004/0242257 A1 | 12/2004 | Valkealahti et al. | |
| 2005/0233754 A1 | 10/2005 | Beale | |
| 2005/0243793 A1 | 11/2005 | Kim et al. | |
| 2006/0013185 A1 | 1/2006 | Seo et al. | |
| 2006/0014505 A1 | 1/2006 | Hiraki | |
| 2006/0034216 A1 | 2/2006 | Kim et al. | |
| 2006/0058054 A1 | 3/2006 | Hiramatsu | |
| 2006/0092870 A1 | 5/2006 | Kondou et al. | |
| 2006/0165028 A1 | 7/2006 | Hiraki et al. | |
| 2006/0211391 A1 | 9/2006 | Nishikawa et al. | |
| 2007/0076807 A1 | 4/2007 | Jin et al. | |
| 2007/0082619 A1 | 4/2007 | Zhang et al. | |
| 2007/0099647 A1 | 5/2007 | Lee et al. | |
| 2007/0153727 A1 | 7/2007 | McBeath et al. | |
| 2007/0254595 A1 | 11/2007 | Yoon et al. | |
| 2007/0265017 A1 | 11/2007 | Ishii et al. | |
| 2007/0270154 A1 | 11/2007 | Kim et al. | |
| 2007/0275728 A1 | 11/2007 | Lohr et al. | |
| 2008/0005639 A1 | 1/2008 | Frederiksen | |
| 2008/0031170 A1 | 2/2008 | Kikuchi | |
| 2008/0056179 A1 | 3/2008 | Kim et al. | |
| 2008/0064386 A1 | 3/2008 | Nibe | |
| 2008/0070610 A1 | 3/2008 | Nishio | |
| 2008/0207150 A1 | 8/2008 | Malladi et al. | |
| 2008/0212506 A1 | 9/2008 | Lee et al. | |
| 2008/0233964 A1 | 9/2008 | McCoy et al. | |
| 2008/0268785 A1 | 10/2008 | McCoy et al. | |
| 2008/0287138 A1 | 11/2008 | Yoon et al. | |
| 2008/0311919 A1 | 12/2008 | Whinnett et al. | |
| 2008/0316961 A1 | 12/2008 | Bertrand et al. | |
| 2009/0034505 A1 | 2/2009 | Papasakellariou et al. | |
| 2009/0122736 A1 | 5/2009 | Damnjanovic et al. | |
| 2009/0180414 A1 | 7/2009 | Maeda et al. | |
| 2009/0185577 A1 | 7/2009 | Kishiyama et al. | |
| 2009/0190528 A1 | 7/2009 | Chung et al. | |
| 2009/0196249 A1 | 8/2009 | Kawamura et al. | |
| 2009/0201885 A1 | 8/2009 | Kuroda et al. | |
| 2009/0215464 A1 | 8/2009 | Tanno et al. | |
| 2009/0220017 A1 | 9/2009 | Kawamura et al. | |
| 2009/0238121 A1 | 9/2009 | Kotecha | |
| 2009/0238241 A1 | 9/2009 | Hooli et al. | |
| 2009/0305715 A1 | 12/2009 | Barve et al. | |
| 2009/0316633 A1 | 12/2009 | Kato et al. | |
| 2009/0323542 A1 | 12/2009 | Aiba et al. | |
| 2009/0325502 A1 | 12/2009 | Aiba et al. | |
| 2009/0325505 A1 | 12/2009 | Aiba et al. | |
| 2009/0325616 A1 | 12/2009 | Aiba et al. | |
| 2009/0325617 A1 | 12/2009 | Aiba et al. | |
| 2009/0325618 A1 | 12/2009 | Aiba et al. | |
| 2009/0325619 A1 | 12/2009 | Aiba et al. | |
| 2010/0098006 A1* | 4/2010 | Golitschek Edler Von Elbwart et al. | 370/329 |
| 2010/0103833 A1 | 4/2010 | Englund et al. | |
| 2010/0113057 A1 | 5/2010 | Englund et al. | |
| 2010/0173638 A1 | 7/2010 | Aiba et al. | |
| 2010/0179702 A1* | 7/2010 | Guo et al. | 700/286 |
| 2010/0183086 A1 | 7/2010 | Ko et al. | |
| 2010/0284326 A1 | 11/2010 | Oh | |
| 2010/0296460 A1 | 11/2010 | Akimoto et al. | |
| 2011/0158195 A1 | 6/2011 | Toda et al. | |
| 2011/0255629 A1 | 10/2011 | Ko et al. | |
| 2012/0164958 A1 | 6/2012 | Hoshino et al. | |
| 2012/0314731 A1 | 12/2012 | Nguyen | |
| 2013/0178221 A1* | 7/2013 | Jung et al. | 455/450 |

FOREIGN PATENT DOCUMENTS

| | | |
|---|---|---|
| EP | 1811690 A1 | 7/2007 |
| EP | 1871028 A1 | 12/2007 |
| EP | 1892975 A1 | 2/2008 |
| EP | 1916859 A1 | 4/2008 |
| JP | 2003-510893 A | 3/2003 |
| JP | 2003-199173 A | 7/2003 |
| JP | 2005-130491 A | 5/2005 |
| JP | 2005-237005 A | 9/2005 |
| JP | 2006-262077 A | 9/2006 |
| JP | 2006-352382 A | 12/2006 |
| JP | 2007-124662 A | 5/2007 |
| RU | 2108670 C1 | 4/1998 |
| RU | 2290764 C2 | 12/2006 |
| WO | WO 2005/072073 A2 | 8/2005 |
| WO | WO 2005/122616 A1 | 12/2005 |
| WO | WO 2006/043712 A1 | 4/2006 |
| WO | WO 2006/109436 A1 | 10/2006 |
| WO | WO 2006/109646 A1 | 10/2006 |
| WO | WO 2007/013457 A1 | 2/2007 |
| WO | WO 2008/115110 A1 | 9/2008 |

OTHER PUBLICATIONS

Nokia, Nokia Siemens Networks; CQI Trigger Mechanism, 7.4.5, R1-073680, 3GPP TSG-RAN WG1 Meeting #50, Athens, Greece, Aug. 20-24, 2007.

Nokia, Nokia Siemens Networks; PDCCH UL and DL Signaling Entity Payloads, 7.13.1, R1-072301, 3GPP TSG RAN WG1 #49 Meeting, Kobe, Japan, May 7-11, 2007.

U.S. Office Action issued in U.S. Appl. No. 13/474,393 on Jan. 15, 2013.

U.S. Office Action issued in U.S. Appl. No. 13/620,084 on Jan. 15, 2013.

U.S. Office Action issued in U.S. Appl. No. 13/368,970 on Feb. 15, 2013.

Huawei, "Bandwidth efficient UL L1/L2 control messages", TSG RAN WG1 Meeting #48bis, St. Julian, Malta, Mar. 26-30, 2007, R1-071419.

Nokia, "Data-non-associated control signal transmission with UL data", 3GPP TSG RAN WG1 Meeting #48, St. Louis, USA, Feb. 12-16, 2007, R1-071000.

Samsung, "Uplink control signal transmission in presence of data", 3GPP TSG RAN WG1 Meeting #48bis, St. Julians, Malta, Mar. 26-30, 2007, R1-071575.

U.S. Notice of Allowance issued in U.S. Appl. No. 12/461,988 on May 10, 2013.

U.S. Office Action issued in U.S. Appl. No. 12/529,042 on Mar. 15, 2013.

"3rd Generation Partnership Project; Technical Specification Group Radio Access Network; Evolved Universal Terrestrial Radio Access (E-UTRA); Physical Layer procedures (Release 8)," 3GPP TS 36.213 v8.0.0, XP 05077555, pp. 1-14, Sep. 1, 2007.

(56) References Cited

OTHER PUBLICATIONS

"CQI reporting and resource allocation for CQI reporting w.r.t. DRX level," IPWireless, 3GPP TSG RAN WG2 #57bis, XP050134358, 3 pages, R2-071419, Mar. 26-30, 2007.
Benq Mobile, "Dynamic control of CQI reporting," 3GPP TSG RAN WG2 #54, Tallinn, Estonia, Aug. 28-Sep. 1, 2006, R2-062448, 5 pages.
Ericsson, "E-UTRA Intra-frequency Measurement Configuration and Control," 3GPP TSG-RAN WG2 Meeting #56, Riga, Latvia, Nov. 6-10, 2006, R2-063228, 4 pages.
Ericsson, Alcatel-Lucent, CATT, Freescale Semiconductor, Huawei, Icera Semiconductor, Interdigital, IPWireless, LGE, Mitsubishi, Motorola, Nextwave, Nokia, Nokia Siemens Networks, Nortel, NTT DoCoMo, Panasonic, Philips, Qualcomm Europe, Samsung, Sharp, Texas Instruments, ZTE, "Way forward for CQI Reporting" 3GPP TSG-RAN WG1 Meeting #50 Athens Greece Aug. 20-24, 2007.
Eurasian Search Report issued in Eurasian Patent Application No. 100901117 on Jan. 13, 2010.
Eurasian Search Report issued in Eurasian Patent Application No. 200970770 on Jan. 13, 2010.
European Search Report issued in European Patent Application No. EP 09 01 1158 on Aug. 4, 2011.
European Search Report issued in European Patent Application No. EP 09 01 1159 on Aug. 4, 2011.
European Search Report issued in European Patent Application No. EP 09 01 1160 on Aug. 4, 2011.
European Search Report issued in European Patent Application No. EP 09 01 1162 on Aug. 19, 2011.
European Search Report issued in European Patent Application No. EP 09 01 1163 on Aug. 19, 2011.
European Search Report issued in European Patent Application No. EP 09 01 1164 on Aug. 19, 2011.
European Search Report issued in European Patent Application No. EP 09 01 1165 on Aug. 19, 2011.
LG Electronics, "Issue on periodic measurement reporting," 3GPP TSG RAN WG2 #57bis, St. Julian's, Malta, Mar. 26-30, 2007, Tdoc R2-071448, pp. 1-3.
Notice of Allowance issued in U.S. Appl. No. 12/529,152 on Jul. 26, 2011.
Notice of Allowance issued in U.S. Appl. No. 12/555,566 on Jul. 18, 2011.
Office Action dated Dec. 10, 2010 in U.S. Appl. No. 12/461,986.
Office Action dated Dec. 13, 2010 in U.S. Appl. No. 12/461,988.
Office Action dated Dec. 13, 2010 in U.S. Appl. No. 12/529,042.
Office Action dated Dec. 9, 2010 in U.S. Appl. No. 12/461,987.
Office Action dated Jan. 19, 2011 in U.S. Appl. No. 12/555,566.
Office Action dated Jan. 21, 2011 in U.S. Appl. No. 12/529,152.
Office Action dated Jan. 26, 2011 in U.S. Appl. No. 12/461,986.
Office Action dated Jan. 27, 2011 in U.S. Appl. No. 12/461,987.
Office Action dated Oct. 14, 2010 in U.S. Appl. No. 12/529,152.
Office Action issued in U.S. Appl. No. 12/555,536 on Nov. 14, 2011.
Russian Patent Application No. 2290764-C2, dated Dec. 27, 2008 (Abstract Only).
Samsung, "CQI handling during DRX," 3GPP TSG-RAN2 Meeting #58, Kobe, Japan, May 7-11, 2007, Tdoc R2-071901, pp. 1-4.
SHRCWC, "A new format of UL scheduling grant signaling for E-UTRA," 3GPP TSG-RAN WG2 #55, Seoul, Korea, Oct. 9-12, 2006, R2-06xxxx, pp. 1-5.

Supplementary Search Report dated Feb. 2, 2011 in European Application No. 08829634.8.
Supplementary Search Report dated Jan. 12, 2011 in European Application No. 08765266.5.
U.S. Advisory Action issued in U.S. Appl. No. 12/461,987 on Sep. 17, 2012.
U.S. Notice of Allowance issued in U.S. Appl. No. 12/555,536 on Apr. 2, 2012.
U.S. Notice of Allowance issued in U.S. Appl. No. 12/555,555 on Sep. 25, 2012.
U.S. Notice of Allowance issued in U.S. Appl. No. 12/555,578 on Aug. 31, 2011.
U.S. Notice of Allowance issued in U.S. Appl. No. 12/555,593 on Sep. 2, 2011.
U.S. Notice of Allowance issued in U.S. Appl. No. 13/315,108 on Sep. 11, 2012.
U.S. Office Action issued in U.S. Appl. No. 12/461,987 on Jul. 5, 2012.
U.S. Office Action issued in U.S. Appl. No. 12/461,988 on Aug. 17, 2011.
U.S. Office Action issued in U.S. Appl. No. 12/461,988 on May 10, 2012.
U.S. Office Action issued in U.S. Appl. No. 12/529,042 on Mar. 1, 2012.
U.S. Office Action issued in U.S. Appl. No. 12/529,042 on May 14, 2012.
U.S. Office Action issued in U.S. Appl. No. 12/529,042 on Sep. 6, 2012.
U.S. Office Action issued in U.S. Appl. No. 12/529,152 on Oct. 14, 2010.
U.S. Office Action issued in U.S. Appl. No. 12/555,555 on Dec. 30, 2011.
U.S. Office Action issued in U.S. Appl. No. 12/555,555 on Jun. 28, 2012.
U.S. Office Action issued in U.S. Appl. No. 13/315,108 on May 3, 2012.
U.S. Office Action, dated Apr. 15, 2011, for U.S. Appl. No. 12/555,578.
U.S. Office Action, dated Apr. 15, 2011, for U.S. Appl. No. 12/555,593.
U.S. Office Action, dated Apr. 5, 2011, for U.S. Appl. No. 12/461,988.
U.S. Office Action, dated Jul. 8, 2011, for U.S. Appl. No. 12/529,042.
U.S. Office Action, dated Jun. 13, 2011, for U.S. Appl. No. 12/461,988 (Advisory Action).
U.S. Office Action, dated Jun. 24, 2011, for U.S. Appl. No. 12/461,987.
U.S. Notice of Allowance issued in U.S. Appl. No. 13/620,084 on Jul. 1, 2013.
U.S. Notice of Allowance issued in U.S. Appl. No. 13/368,970 on Aug. 21, 2013.
U.S. Notice of Allowance issued in U.S. Appl. No. 13/926,803 on Sep. 25, 2013.
U.S. Office Action issued in U.S. Appl. No. 13/926,803 on Aug. 15, 2013.
U.S. Office Action issued in U.S. Appl. No. 13/474,393 on Sep. 27, 2013.
U.S. Office Action issued in U.S. Appl. No. 13/906,107 on Nov. 5, 2013.

* cited by examiner

MOBILE COMMUNICATION SYSTEM, BASE STATION APPARATUS, AND MOBILE STATION APPARATUS

This application is a Divisional of co-pending application Ser. No. 12/555,555 filed on Sep. 8, 2009, which is a Divisional of co-pending application Ser. No. 12/529,152 filed on Aug. 28, 2009 and for which priority is claimed under 35 U.S.C. §120, Application No. JP2007-152560 filed Jun. 8, 2007 is the national phase of PCT International Application No. PCT/2008/060453 filed on Jun. 6, 2008 under 35 U.S.C. §371. The entire contents of each of the above-identified applications are hereby incorporated by reference.

TECHNICAL FIELD

The present invention relates to a mobile station system in which a mobile station apparatus measures reception quality of a signal received from a base station apparatus to transmit reception quality information to the base station apparatuses, and relates to a base station apparatus and a mobile station apparatus which are applied to such a mobile communication system.

BACKGROUND ART

In recent years, in mobile communication systems, there is increased demand of data communication and there are proposed various technologies in which high spectrum efficiency responding to an increase of transmission data following the increased demand. As one of technologies for enhancing the spectrum efficiency, there is OFDMA (Orthogonal Frequency Division Multiple Access). This OFDMA relates to a technology of modulation method in performing communication by using the same frequency at all cells within communication area composed of cells and can realize high speed data communication.

In scheduling of transmission packets in the OFDMA system, there is known a method in which mobile station apparatuses transmit, to the base station apparatus, CQI (Channel Quality Indicator) which is information indicating reception quality of a downlink state for subcarriers in wideband, and the base station apparatus performs scheduling of the packet on the basis of the CQI of subcarriers in wideband transmitted from the each mobile station apparatuses.

Moreover, in scheduling of transmission packets in an OFDM (Orthogonal Frequency Division Multiplexing) system using plural subcarriers, there is also known a technology in which mobile station apparatuses evaluate each channel states of a downlink (frequency characteristics, i.e., characteristics of transmission loss, etc., depending on frequency) and transmit information obtained by quantizing each channel states to the base station apparatus, and the base station apparatus determines subcarriers assigned to each mobile station apparatuses on the basis of the transmitted information (Patent Literature 1).

FIG. 18 is a view for illustrating a conventional communication method between the base station apparatus and the mobile station apparatus. Having received downlink information of the downlink used for reception quality measurement from the base station apparatus, the mobile station apparatus measures the reception quality of each channel on the basis of the downlink information to create a channel profile of propagation path.

The channel profile the mobile station apparatus has created is transmitted from the mobile station apparatus to the base station apparatus as reception quality information using an uplink. The base station apparatus performs processing of adaptive modulation and coding or frequency selective scheduling on a signal to be transmitted from the base station apparatus to the mobile station apparatus on the base of the reception quality information.

In regard to transmission of the reception quality information to the base station apparatus by the mobile station apparatus, in evolution of the third-generation radio access (Evolved Universal Terrestrial Radio Access) being studied by the 3GPP (3rd Generation Partnership Project) which is the International Standardization Project, it is studied that the reception quality information is transmitted from the mobile station apparatus to the base station apparatus using a dedicated uplink control channel (hereinafter referred to as PUCCH (Physical Uplink Control Channel), or an uplink data channel (hereinafter refereed to as PUSCH (Physical Uplink Shared Channel).

For example, in the non Patent Literature 1, there is proposed a method to transmit, in transmitting the reception quality information from the mobile station apparatus to the base station apparatus, the reception quality information using the PUCCH or the PUSCH depending on a kind of services different in required the reception quality information.

Patent Literature 1: Japanese Patent Application Laid Open No. 2005-130491

Non-Patent literature 1: "CQI handling during DRX", 3GPP, TSG RAN WG2 Meeting #58, R2-071901, May 2007

DISCLOSURE OF THE INVENTION

Problems to be Solved by the Invention

However, in the prior arts, there are no practical description of what kind of control information the base station apparatus use to control the mobile station apparatus in transmitting, on the PUCCH or the PUSCH, the reception quality information from the mobile station apparatus to the base station apparatus, and what kind of information exchange between the base station apparatus and the mobile station apparatus so that the reception quality information is transmitted.

In transmission of the reception quality information, for example, there are instances where the base station apparatus needs to transmit, to the mobile station apparatus, a large information amount such as the reception quality information with respect to all channels obtained by dividing a transmission frequency band every predetermined regions in order to perform suitable frequency selective scheduling.

On the other hand, for example, there are also cases where the base station apparatus requires the mobile station apparatus to transmit the reception quality information of small information amount such as average value of wideband in order to perform adaptive modulation and coding, and the size of information amount of the reception quality information to be transmitted from the mobile station apparatus to the base station apparatus has a wide range.

In addition, there is a demand such that the base station apparatus controls the size and the transmission frequency of the reception quality information. The base station apparatus should control the size and the transmission frequency of the transmitted reception quality information in consideration of an uplink resource within a cell the base station apparatus itself controls. If large-sized reception quality information is transmitted at high frequency based on the decision of each mobile station apparatus, the uplink resource within the cell runs out. On the other hand, if small-sized reception quality information is transmitted at low frequency, the uplink resource will be wastefully used.

Namely, in transmission of the reception quality information from the mobile station apparatus to the base station apparatus, it is very important to control the mobile station apparatus using what kind of control information from the base station apparatus, and to transmit the reception quality information by performing what kind of information exchange between the base station apparatus and the mobile station apparatus, and it is required to employ an efficient transmission control method in consideration of the information amount and the transmission frequency of the reception quality information to be transmitted.

The present invention is made in view of such circumstances, and its object is to provide a mobile communication system, a base station apparatus and a mobile station apparatus which can realize the efficient transmission control of the reception quality information which can flexibly treat the information amount and the transmission frequency of the reception quality information.

Means for Solving the Problems (1) In order to attain the above mention objects, the following means were carried out in the present invention. Namely, a mobile communication system according to the present invention is directed to a mobile communication system in which a mobile station apparatus transmits, to a base station apparatus, reception quality information indicating quality of a signal received from said base station apparatus, wherein said base station apparatus transmits, to said mobile station apparatus, an uplink data transmission permission signal including a transmission instruction of reception quality information, and wherein said mobile station apparatus transmits, to said base station apparatus, reception quality information in case that a transmission instruction of said reception quality information is included in said uplink data transmission permission signal.

(2) Moreover, in the mobile communication system of the present invention, said mobile station apparatus transmits, to said base station apparatus, said reception quality information using an uplink data channel.

(3) Further, in the mobile communication system of the present invention, said mobile station apparatus transmits, to said base station apparatus, said reception quality information together with uplink data.

(4) Further, mobile communication system of the present invention is directed to a mobile communication system in which a mobile station apparatus transmits, to a base station apparatus, reception quality information indicating quality of a signal received from said base station apparatus, wherein said base station apparatus: transmits, to said mobile station apparatus, a radio resource control signal including a transmission instruction for periodically transmitting first reception quality information; and transmits, to said mobile station apparatus, an uplink data transmission permission signal including a transmission instruction of second reception quality information, and wherein said mobile station apparatus: periodically transmits, to said base station apparatus, said first reception quality information according to said radio resource control signal including a transmission instruction for periodically transmitting said first reception quality information; and transmits, to said base station apparatus, said second reception quality information in case that a transmission instruction of said reception quality information is included in said uplink data transmission permission signal.

(5) Further, the mobile communication system is directed to a mobile communication system in which a mobile station apparatus transmits, to a base station apparatus, reception quality information indicating quality of a signal received from said base station apparatus, wherein said base station apparatus: transmits, to said mobile station apparatus, a radio resource control signal including a transmission instruction for periodically transmitting first reception quality information; and transmits, to said mobile station apparatus, an uplink data transmission permission signal including a transmission instruction of second reception quality information, and wherein said mobile station apparatus: periodically transmits, to said base station apparatus, said first reception quality information according to said radio resource control signal including a transmission instruction for periodically transmitting said first reception quality information; transmits, to said base station, said second reception quality information apparatus in case that receiving said uplink data transmission permission signal including a transmission instruction of said second reception quality information; and transmits said second reception quality information in case that transmission of said first reception quality information and transmission of said second reception quality information would occur at the same time.

(6) Further, the mobile communication system of the present invention is directed to a mobile communication system in which a mobile station apparatus transmits, to a base station apparatus, reception quality information indicating quality of a signal received from said base station apparatus, wherein said base station apparatus: transmits, to said mobile station apparatus, a radio resource control signal including a transmission instruction for periodically transmitting first reception quality information; and transmits an uplink data transmission permission signal to said mobile station apparatus, and wherein said mobile station apparatus: periodically transmits said first reception quality information using an uplink control channel according to said radio resource control signal including a transmission instruction for periodically transmitting said first reception quality information to said base station apparatus; transmits said second reception quality information using an uplink data channel in case that a transmission instruction of reception quality information is included in said uplink data transmission permission signal; and transmits said first reception quality information using an uplink data channel in case that transmission of said first reception quality information and transmission using an uplink data channel according to an uplink data transmission permission signal which does not include a transmission instruction of said reception quality information would occur at the same time.

(7) Further, in the mobile communication system of the present invention, said first reception quality information transmitted using said uplink data channel has a form in which reception quality information is transmitted using an uplink control channel.

(8) The mobile communication system is directed to a mobile communication system in which a mobile station apparatus transmits, to a base station apparatus, reception quality information indicating quality of a signal received from said base station apparatus, wherein said base station apparatus transmits, to said mobile station apparatus, said uplink data transmission permission signal including a transmission instruction of reception quality information, and wherein said mobile station apparatus transmits, to said base station apparatus, reception quality information using said uplink data channel by modulating the information with a modulation scheme corresponding to a modulation scheme of uplink data specified by said uplink data transmission permission signal in case that a transmission instruction of said reception quality information is included in said uplink data transmission permission signal.

(9) Further, the mobile communication system of the present invention is directed to a mobile communication system in which a mobile station apparatus transmits, to a base station apparatus, reception quality information indicating quality of a signal received from said base station apparatus, wherein said base station apparatus transmits, to said mobile station apparatus, said uplink data transmission permission signal including a transmission instruction of reception quality information, and wherein said mobile station apparatus transmits, to said base station apparatus, reception quality information using said uplink data channel by coding the information with a coding scheme corresponding to a coding scheme of uplink data specified by said uplink data transmission permission signal in case that a transmission instruction of said reception quality information is included in said uplink data transmission permission signal.

(10) Further, the mobile communication system of the present invention is directed to a mobile communication system in which a mobile station apparatus transmits, to a base station apparatus, reception quality information indicating quality of a signal received from said base station apparatus, wherein said base station apparatus transmits, to said mobile station apparatus, an uplink data transmission permission signal including a transmission instruction of reception quality information, and wherein said mobile station apparatus transmits, to said base station apparatus, reception quality information together with uplink data by assigning the reception quality information in a low frequency band of uplink data channel in case that a transmission instruction of said reception quality information is included in said uplink data transmission permission signal.

(11) Further, the mobile communication system of the present invention is directed to A mobile communication system in which a mobile station apparatus transmits, to a base station apparatus, reception quality information indicating quality of a signal received from said base station apparatus, wherein said base station apparatus: transmits, to said mobile station apparatus, a radio resource control signal including information for specifying a physical format in transmitting reception quality information together with uplink data; and transmits, to said mobile station apparatus, an uplink data transmission permission signal including a transmission instruction of reception quality information, and wherein said mobile station apparatus transmits, to said base station apparatus, reception quality information together with uplink data according to information for specifying a physical format in transmitting reception quality information together with uplink data included in said radio resource control signal in case that a transmission instruction of said reception quality information is included in said uplink data transmission permission signal.

(12) Further, in the mobile communication system of the present invention, information for specifying said physical format is information for determining ratio of reception quality information transmitted together with said uplink data.

(13) Further, in the mobile communication system of the present invention, information for specifying said physical format is information for specifying a modulation scheme of reception quality information.

(14) Further, in the mobile communication system of the present invention, information for specifying said physical format is information for specifying a coding scheme of reception quality information.

(15) Further, the mobile communication system of the present invention is directed to a mobile communication system in which a mobile station apparatus transmits, to a base station apparatus, reception quality information indicating quality of a signal received from said base station apparatus, wherein said base station apparatus transmits, to said mobile station apparatus, an uplink data transmission permission signal, and wherein said mobile station apparatus: periodically transmits, to said base station apparatus, first reception quality information even in case that a transmission instruction of reception quality information is not included in said uplink data transmission permission signal; transmits, to said base station apparatus, second reception quality information in case that a transmission instruction of reception quality information is included in said uplink data transmission permission signal; and transmits said first reception quality information and second reception quality information in different physical formats.

(16) Further, in the mobile communication system of the present invention, said first reception quality information and second reception quality information have ratios with respect to uplink data which are different from each other.

(17) Further, in the mobile communication system of the present invention, said first reception quality information and second reception quality information have modulation schemes different from each other.

(18) Further, in the mobile communication system of the present invention, said first reception quality information and second reception quality information have coding schemes different from each other.

(19) Further, the mobile communication system of the present invention is directed to a mobile communication system in which a mobile station apparatus transmits, to a base station apparatus, reception quality information indicating quality of a signal received from said base station apparatus: wherein said base station apparatus transmits, to said mobile station apparatus, an uplink data transmission permission signal; wherein said mobile station apparatus: periodically transmits, to said base station apparatus, first reception quality information even in case that a transmission instruction of reception quality information is not included in said uplink data transmission permission signal; and transmits, to said base station apparatus, second reception quality information in case that a transmission instruction of reception quality information is included in said uplink data transmission permission signal; and wherein information amount of said second reception quality information is larger than that of said first reception quality information.

(20) Further, a base station apparatus of the present invention is directed to a base station apparatus in a mobile communication system in which a mobile station apparatus transmits, to said base station apparatus, reception quality information indicating quality of a signal received from said base station apparatus, said base station apparatus comprising, means for transmitting a transmission instruction of said reception quality information included in an uplink data transmission permission signal to said mobile station apparatus.

(21) Further, the base station apparatus of the present invention is directed to a base station apparatus in a mobile communication system in which a mobile station apparatus transmits, to said base station apparatus, reception quality information indicating quality of a signal received from said base station apparatus, said base station apparatus comprising: means for transmitting a radio resource control signal including a transmission instruction for periodically transmitting first reception quality information to said mobile station apparatus; and means for transmitting a transmission instruction of second reception quality information included in an uplink data transmission permission signal to said mobile station apparatus.

(22) Further, the base station apparatus of the present invention is directed to a base station apparatus in a mobile communication system in which a mobile station apparatus transmits, to a base station apparatus, reception quality information indicating quality of a signal received from said base station apparatus, comprising: means for transmitting, to said mobile station apparatus, a radio resource control signal including information for specifying a physical format in transmitting said reception quality information together with uplink data; and means for transmitting, to said mobile station apparatus, a transmission instruction of said reception quality information included in an uplink data transmission permission signal.

(23) Further, in the base station apparatus of the present invention, information for specifying said physical format is information for determining ratio of reception quality information transmitted together with said uplink data.

(24) Further, in the base station apparatus of the present invention, information for specifying said physical format is information for specifying a modulation scheme of reception quality information.

(25) Further, in the base station apparatus of the present invention, information for specifying said physical format is information for specifying a coding scheme of reception quality information.

(26) Further, the mobile station apparatus of the present invention is directed to a mobile station apparatus in a mobile communication system in which said mobile station apparatus transmits, to a base station apparatus, reception quality information indicating quality of a signal received from said base station apparatus, said mobile station apparatus comprising: means for receiving an uplink data transmission permission signal from said base station apparatus; and means for transmitting reception quality information to said base station apparatus in case that a transmission instruction of reception quality information is included in said uplink data transmission permission signal.

(27) Further, the mobile station apparatus of the present invention is directed to a mobile station apparatus in a mobile communication system in which said mobile station apparatus transmits, to a base station apparatus, reception quality information indicating quality of a signal received from said base station apparatus, said mobile station apparatus comprising: means for receiving a radio resource control signal including a transmission instruction for periodically transmitting first reception quality information from said base station apparatus; means for receiving an uplink data transmission permission signal from said base station apparatus; means for periodically transmitting said first reception quality information to said base station apparatus according to said radio resource control signal including a transmission instruction for periodically transmitting first reception quality information; and means for transmitting second reception quality information to said base station apparatus in case that a transmission instruction of reception quality information is included in said uplink data transmission permission signal.

(28) Further, the mobile station apparatus of the present invention is directed to A mobile station apparatus in a mobile communication system in which said mobile station apparatus transmits, to a base station apparatus, reception quality information indicating quality of a signal received from said base station apparatus, said mobile station apparatus comprising: means for receiving a radio resource control signal including a transmission instruction for periodically transmitting first reception quality information from said base station apparatus; means for receiving an uplink data transmission permission signal from said base station apparatus; means for periodically transmitting said first reception quality information to said base station apparatus according to said radio resource control signal including a transmission instruction for periodically transmitting said first reception quality information; means for transmitting said second reception quality information to said base station apparatus in case that receiving an uplink data transmission permission signal including a transmission instruction of said second reception quality information; and means for transmitting said second reception quality information to said base station apparatus in case that transmission of said first reception quality information and transmission of said second reception quality information would occur at the same time.

(29) Further, the mobile station apparatus of the present invention is directed to a mobile station apparatus in a mobile communication system in which said mobile station apparatus transmits, to a base station apparatus, reception quality information indicating quality of a signal received from said base station apparatus, said mobile station apparatus comprising: means for receiving a radio resource control signal including a transmission instruction for periodically transmitting first reception quality information from said base station apparatus; means for receiving an uplink data transmission permission signal from said base station apparatus; means for periodically transmitting said first reception quality information using an uplink control channel to said base station apparatus according to said radio resource control signal including a transmission instruction for periodically transmitting said first reception quality information; means for transmitting second reception quality information using an uplink data channel to said base station apparatus in case that a transmission instruction of reception quality information is included in said uplink data transmission permission signal, and means for transmitting said first reception quality information using an uplink data channel in case that transmission of said first reception quality information and transmission using an uplink data channel according to an uplink data transmission permission signal which does not include a transmission instruction of said reception quality information would occur at the same time.

(30) Further, the mobile station apparatus of the present invention is directed to A mobile station apparatus in a mobile communication system in which said mobile station apparatus transmits, to a base station apparatus, reception quality information indicating quality of a signal received from said base station apparatus, said mobile station apparatus comprising: means for receiving an uplink data transmission permission signal from said base station apparatus; means for transmitting reception quality information by modulating the information with a modulation scheme corresponding to a modulation scheme of uplink data specified by said uplink data transmission permission signal in case that a transmission instruction of said reception quality information is included in said uplink data transmission permission signal.

(31) Further, the mobile station apparatus of the present invention is directed to A mobile station apparatus in a mobile communication system in which said mobile station apparatus transmits, to a base station apparatus, reception quality information indicating quality of a signal received from said base station apparatus, said mobile station apparatus comprising: means for receiving an uplink data transmission permission signal from said base station apparatus; and means for transmitting reception quality information by coding the information with a coding scheme corresponding to a coding scheme of uplink data specified by said uplink data transmission permission signal in case that a transmission instruction of said reception quality information is included in said uplink data transmission permission signal.

(32) Further, the mobile station apparatus of the present invention is directed to A mobile station apparatus in a mobile communication system in which said mobile station apparatus transmits, to a base station apparatus, reception quality information indicating quality of a signal received from said base station apparatus, said mobile station apparatus comprising: means for receives an uplink data transmission permission signal from said base station apparatus; and means for transmits reception quality information together with uplink data using said uplink data channel by arranging the information in a low frequency band of uplink data channel assigned by said uplink data transmission permission signal in case that a transmission instruction of said reception quality information is included in said uplink data transmission permission signal.

(33) Further, the mobile station apparatus of the present invention is directed to A mobile station apparatus in a mobile communication system in which said mobile station apparatus transmits, to a base station apparatus, reception quality information indicating quality of a signal received from said base station apparatus, said mobile station apparatus comprising: means for receiving, from said base station apparatus, a radio resource control signal including information for specifying a physical format in transmitting reception quality information together with uplink data; and means for transmitting, to said base station apparatus, reception quality information together with uplink data according to information for specifying a physical format in transmitting said reception quality information together with uplink data included in said radio resource control signal

(34) Further, in the mobile station apparatus of the present invention, information for specifying said physical format is information for determining ratio of reception quality information transmitted together with said uplink data.

(35) Further, in the mobile station apparatus of the present invention, information for specifying said physical format is information for specifying a modulation scheme of reception quality information.

(36) Further, in the mobile station apparatus of the present invention, information for specifying a physical format is information for specifying a coding scheme of reception quality information.

(37) Further, the mobile station apparatus of the present invention is directed to A mobile station apparatus in a mobile communication system in which said mobile station apparatus transmits, to a base station apparatus, reception quality information indicating quality of a signal received from said base station apparatus, said mobile station apparatus comprising: means for receiving an uplink data transmission permission signal from said base station apparatus; means for periodically transmitting first reception quality information to said base station apparatus even in case that a transmission instruction of reception quality information is not included in said uplink data transmission permission signal; and means for transmitting second reception quality information to said base station apparatus in case that a transmission instruction of reception quality information is included in said uplink data transmission permission signal, wherein said first reception quality information and said second reception quality information are transmitted in different physical formats.

(38) Further, in the mobile station apparatus of the present invention, said first reception quality information and said second reception quality information have ratios with respect to uplink data different from each other.

(39) Further, in the mobile station apparatus of the present invention, said first reception quality information and said second reception quality information are modulated by different modulation schemes.

(40) Further, in the mobile station apparatus of the present invention, said first reception quality information and said second reception quality information are coded by different coding schemes.

(41) Further, the mobile station apparatus of the present invention is directed to A mobile station apparatus in a mobile communication system in which said mobile station apparatus transmits, to a base station apparatus, reception quality information indicating quality of a signal received from said base station apparatus, said mobile station apparatus comprising: means for receiving an uplink data transmission permission signal from said base station apparatus; means for periodically transmitting first reception quality information to said base station apparatus even in case that a transmission instruction of reception quality information is not included in said uplink data transmission permission signal; and means for transmitting second reception quality information to said base station apparatus incase that a transmission instruction of reception quality information is included in said uplink data transmission permission signal, wherein information amount of said second reception quality information is larger than that of first reception quality information.

Advantage Effect of the Invention

According to the present invention, the base station apparatus can control the transmission frequency of the reception quality information. In addition, it is possible to perform the transmission control of the reception quality information in consideration of the uplink resource within a cell.

Figure 1:
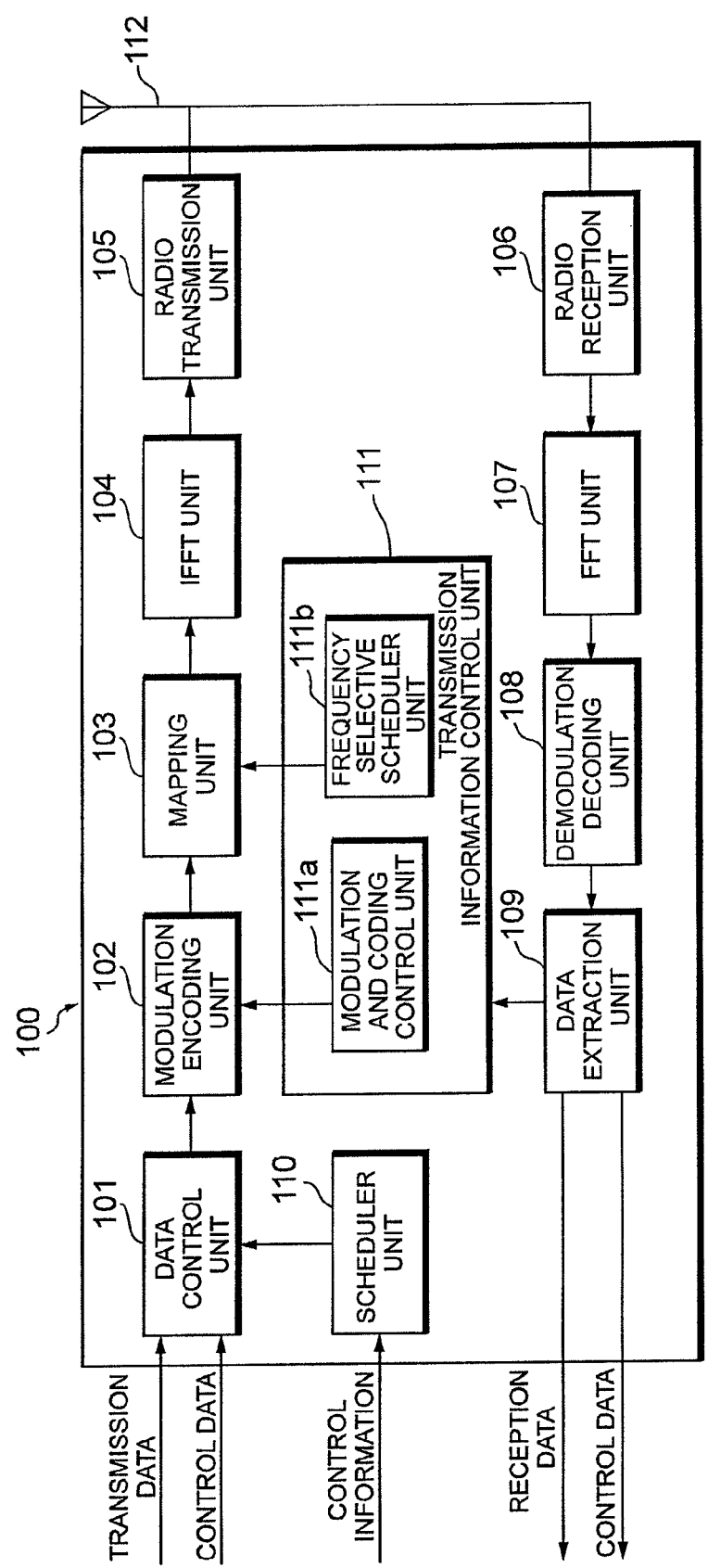
FIG. 1 is a block diagram showing a schematic configuration of a base station apparatus according to a first embodiment of the present invention.

DESCRIPTION OF REFERENCE NUMERALS 100 base station apparatus
101 data control unit
102 modulation encoding unit
103 mapping unit
104 IFFT unit
105 radio transmission unit
106 radio reception unit
107 FFT unit
108 demodulation decoding unit
109 data extracting unit
110 scheduler unit
111 transmission information control unit
111a modulation and coding control unit
111b frequency selective scheduler unit
112 antenna
200 mobile station apparatus
201 data control unit
202 modulation encoding unit
203 mapping unit
204 IFFT unit
205 radio transmission unit
206 radio reception unit
207 FFT unit
208 demodulation decoding unit
209 data extracting unit
210 reception quality information control unit
210a reception quality information generating unit
210b reception quality measurement unit
211 antenna

BEST MODE FOR CARRYING OUT THE INVENTION

First Embodiment

First of all, a mobile communication system according to a first embodiment of the present invention will be described. This mobile communication system is composed of a base station apparatus and mobile station apparatuses. FIG. 1 is a block diagram showing a schematic configuration of the base station apparatus according to the first embodiment of the present invention. A base station apparatus 100 comprises a data control unit 101, a modulation encoding unit 102, a mapping unit 103, an Inverse Fast Fourier Transform (IFFT) unit 104, a radio transmission unit 105, radio reception unit 106, a Fast Fourier Transform (FFT) unit 107, a demodulation decoding unit 108, a data extracting unit 109, a scheduler unit 110, a transmission information control unit 111 and an antenna 112. The transmission information control unit 111 includes a modulation and coding control unit 111a, and a frequency selective scheduler unit 111b.

In the base station apparatus 100, the data control unit 101 receives transmission data and control data which are transmitted to the each mobile station apparatuses and sequentially transmits respective data to the mobile station apparatuses according to instruction from the scheduler unit 110. The modulation encoding unit 102 performs modulation processing and error correction coding processing on a signal output from the data control unit 101 on the basis of modulation scheme and coding rate determined by the modulation code control unit 111a to output the respective data to the mapping unit 103. The mapping unit 103 performs mapping of data output from the modulation encoding unit 102 onto respective subcarriers on the basis of frequency selective scheduling information output from the frequency selective scheduler unit 111b to output the mapped data to the Inverse Fast Fourier Transform unit 104.

The Inverse Fast Fourier Transform unit 104 performs processing of Inverse Fast Fourier Transform on data output from the mapping unit 103, converts the data thus processed into a base band digital signal of time series to output the digital signal thus provided, and outputs the converted data to the radio transmission unit 105. A signal output from the Inverse Fast Fourier Transform unit 104 is subjected to digital analog conversion at the radio transmission unit 105, up-converted into a signal having frequency suitable for transmission, and then transmitted to the respective mobile station apparatuses through the antenna 112.

The scheduler unit 110 performs scheduling of downlink and scheduling of uplink on the basis of control information that each mobile station apparatuses can use, such as resource region, intermittent transmitting/receiving cycle, transmission data channel format and buffer state. The modulation and coding control unit 111a determines modulation scheme and coding rate to be applied to respective data on the basis of reception quality information transmitted from the mobile station apparatus to output them to the modulation encoding unit 102. The frequency selective scheduler unit 111b performs processing of frequency selective scheduling to be applied to respective data on the basis of reception quality information transmitted from the mobile station apparatus to output the result to the mapping unit 103.

Figure 2:
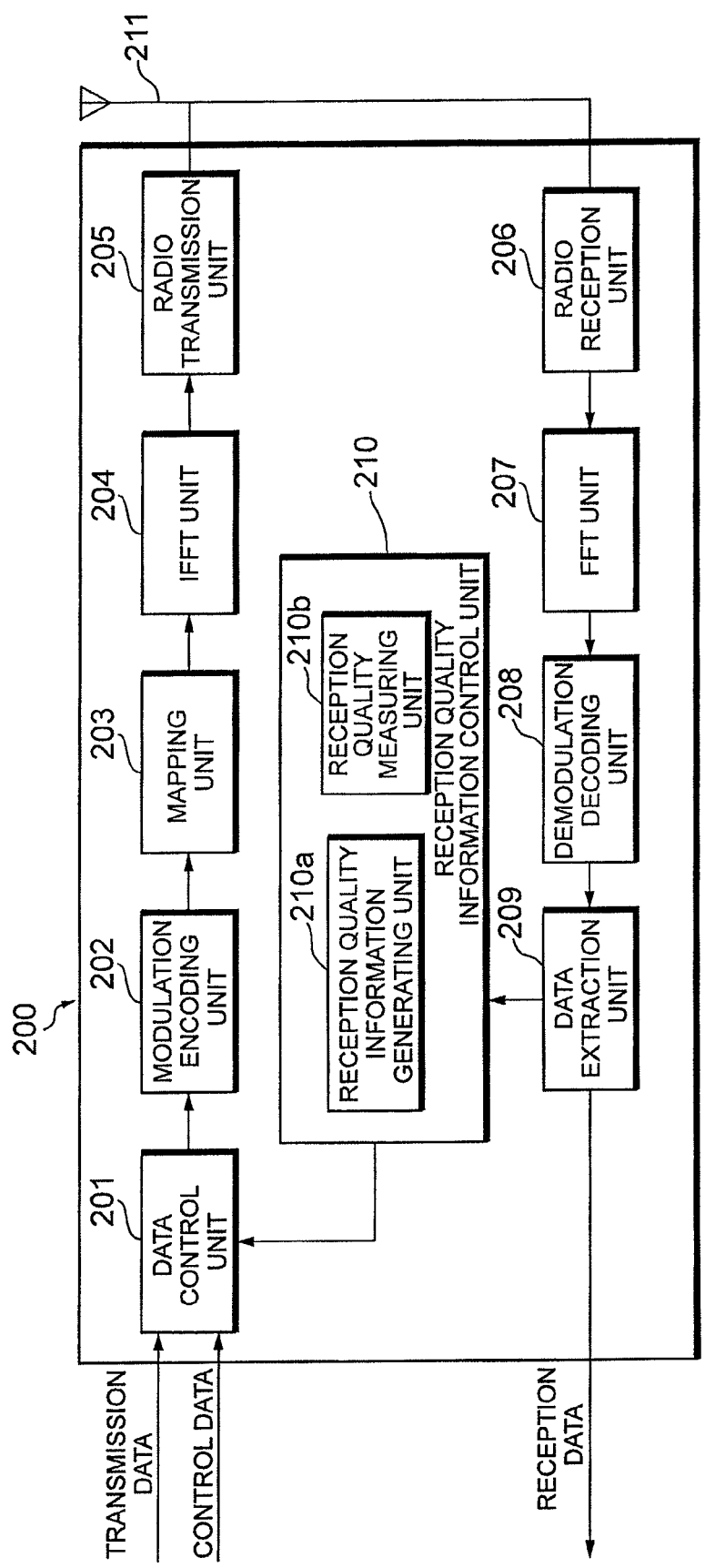
FIG. 2 is a block diagram showing a schematic configuration of a mobile station apparatus according to the first embodiment of the present invention.

FIG. 2 is a block diagram showing a schematic configuration of the mobile station apparatus of the first embodiment of present invention. A mobile station apparatus 200 comprises, a data control unit 201, a modulation encoding unit 202, a mapping unit 203, an Inverse Fast Fourier Transform (IFFT) unit 204, a radio transmission unit 205, a radio reception unit 206, a Fast Fourier Transform (FFT) unit 207, a demodulation decoding unit 208, a data extracting unit 209, a reception quality information control unit 210, and an antenna 211. The reception quality information control unit 210 includes a reception quality information generating unit 210a, and a reception quality measurement unit 210b.

In the mobile station apparatus 200, the data control unit 201 receives transmission data and control data to be transmitted to the base station apparatus, and sequentially transmits respective data to the base station apparatus. The modulation encoding unit 202 performs modulation processing and error correction coding processing on a signal output from the data control unit 201 to output respective data to the mapping unit 203. The mapping unit 203 performs mapping of data output from the modulation encoding unit 202 onto the respective sub carriers to output the mapped data to the Inverse Fast Fourier Transform unit 204.

The Inverse Fast Fourier Transform unit 204 performs processing of Inverse Fast Fourier Transform on a symbol sequence output from the mapping unit 203 to convert it into a time-series baseband digital signal, and outputs thus converted signal to the radio transmission unit 205. The output signal from the Inverse Fast Fourier Transform unit 204 is subjected to digital analog conversion at the radio transmission unit 205 and up-converted into a signal having a frequency suitable for transmission. Thereafter, the signal thus obtained is transmitted to the base station apparatus through the antenna 211.

The reception quality measurement unit 210b measures reception quality of a signal received from the base station apparatus. The reception quality information generating unit 210a generates reception quality information transmitted to the base station apparatus on the basis of information measured by the reception quality measurement unit 210b.

Figure 3:
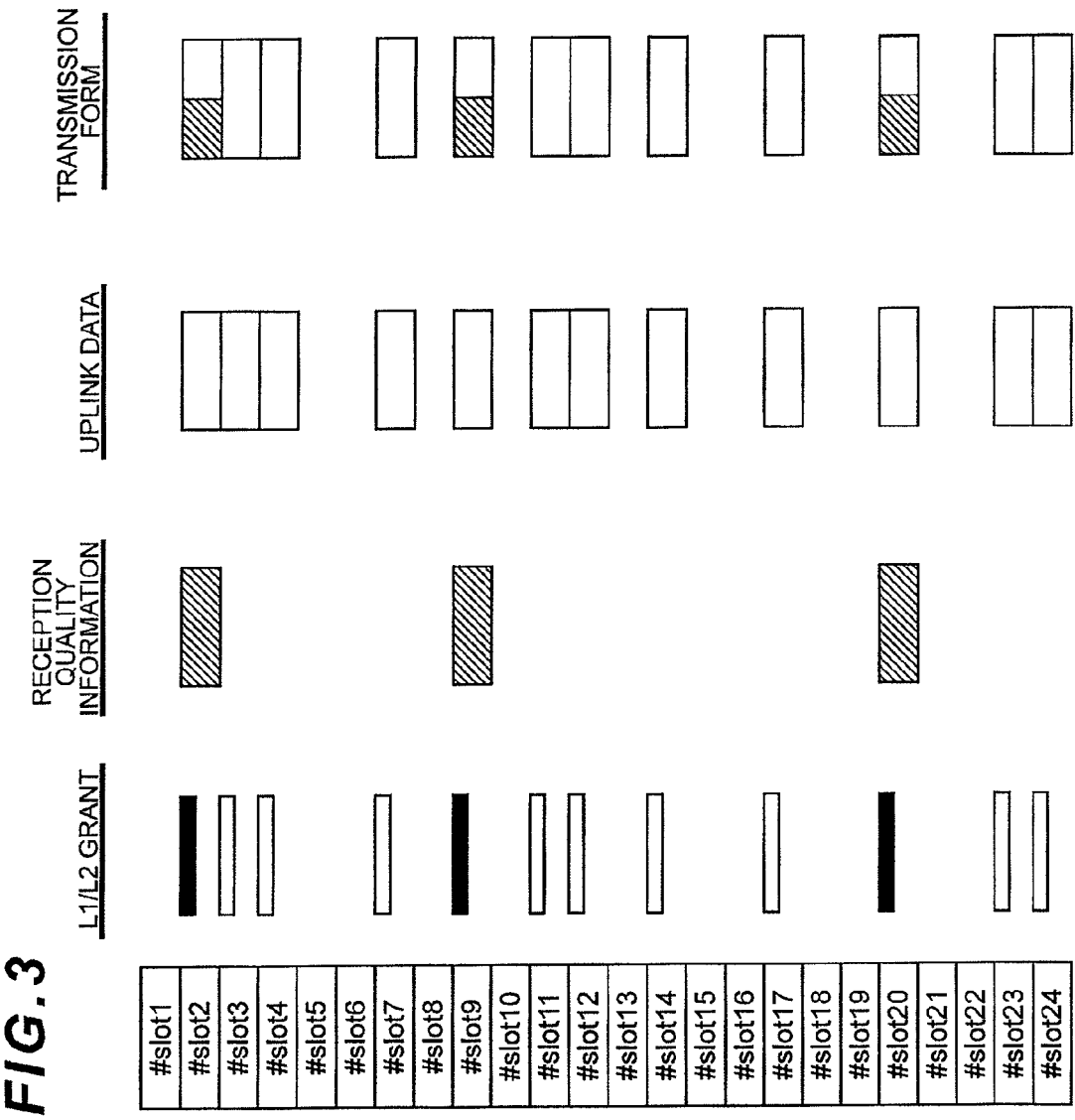
FIG. 3 is a view showing a control signal transmitted from the base station apparatus to the mobile station apparatus, and the reception quality information, the uplink data which are transmitted from the mobile station apparatus to the base station apparatus, and the reception quality information transmission form in the first embodiment according to the present invention.

FIG. 3 is a view showing a control signal transmitted from the base station apparatus to the mobile station apparatus, and the reception quality information, the uplink data which are transmitted from the mobile station apparatus to the base station apparatus, and the reception quality information transmission form. FIG. 3 shows, as an example, the operation from #slot1 to #slot24. The mobile station apparatus transmits data using PUSCH according to resource assignment indicated by a downlink control channel (referred to as PDCCH (Physical Downlink Control Channel)) from the base station apparatus. Namely, this downlink control channel PDCCH is a signal for permitting data transmission in the uplink (hereinafter referred to as "L1/L2 grant" meaning uplink data transmission permission signal).

The operation of the base station apparatus and the mobile station apparatus at #slot2 in FIG. 3 will be described. The base station apparatus which has determined to instruct the mobile station apparatus to transmit the reception quality information transmits the L1/L2 grant (uplink data transmission permission signal) which includes simultaneous transmission permission information for giving an instruction to simultaneously transmit the uplink data and the reception quality information. The mobile station apparatus having received the L1/L2 grant including the simultaneous transmission permission information simultaneously transmits, to the base station apparatus, the uplink data and the reception quality information as indicated by slanting line attached rectangular shape of FIG. 3. It is shown that at #slot2, from the base station apparatus, the L1/L2 grant including the simultaneous transmission permission information is transmitted using the PDCCH at a timing for controlling #slot2 to the mobile station apparatus, and the mobile station apparatus having received the signal simultaneously transmits, to the base station apparatus, the uplink data and the reception quality information.

Further, at #slot3, from the base station apparatus, the L1/L2 grant which does not include the simultaneous transmission permission information is transmitted to the mobile station apparatus, and the mobile station apparatus having received the signal transmits, to the base station apparatus, the uplink data using the PUSCH in a physical format which does not include the reception quality information, as indicated by a white rectangle. FIG. 3 similarly shows that the L1/L2 grant which includes the simultaneous transmission permission information is transmitted from the base station apparatus at #slot9 and #slot20, and the mobile station apparatus having received the signal simultaneously transmits the uplink data and the reception quality information.

Figure 4:
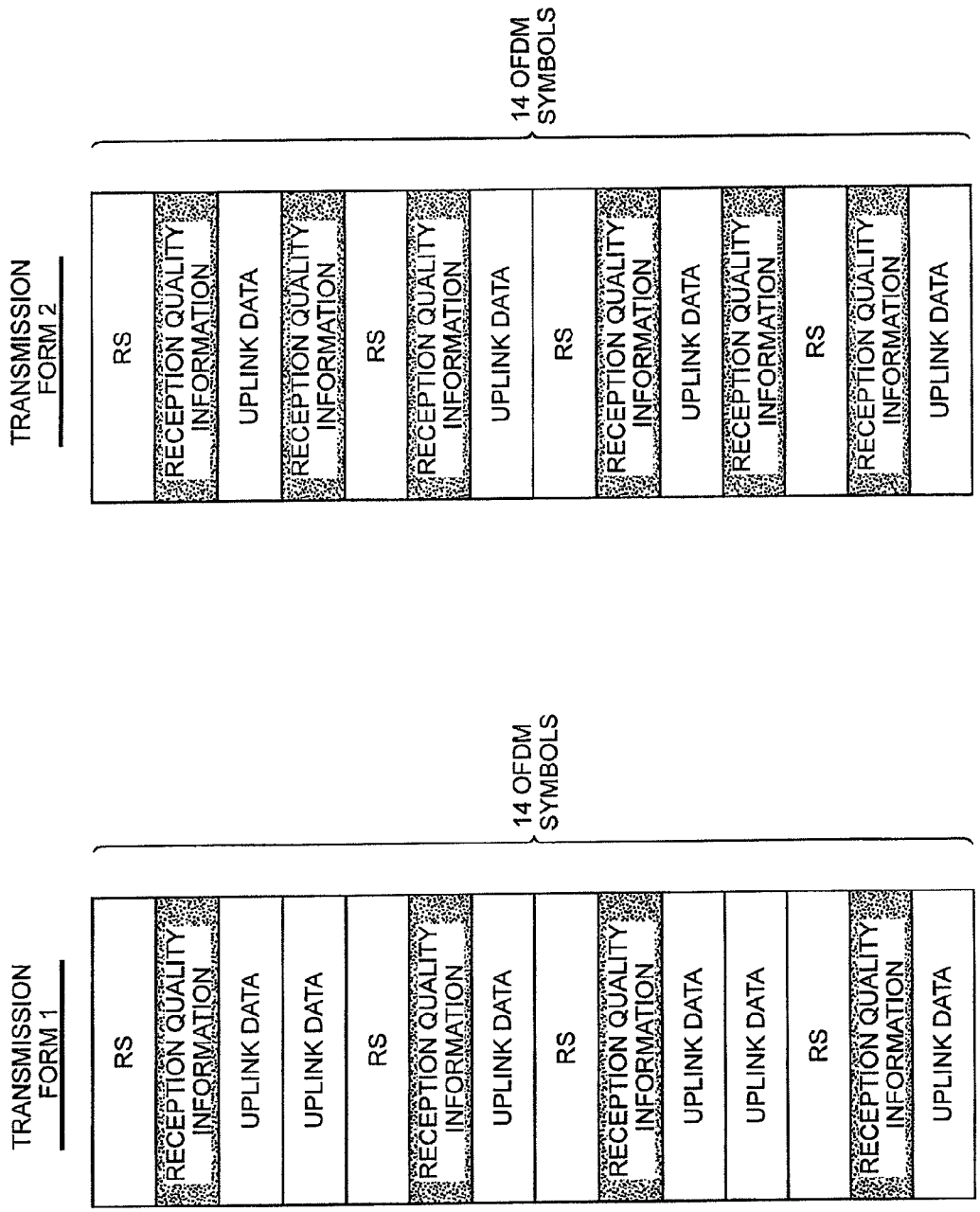
FIG. 4 is a view showing transmission form when the mobile station apparatus simultaneously transmits the uplink data and the reception quality information.

FIG. 4 is a view showing transmission form when the mobile station apparatus simultaneously transmits the uplink data and the reception quality information. FIG. 4 shows, as an example, two physical formats (transmission form 1 and transmission form 2). Data transmitted from the mobile station apparatus to the base station apparatus is represented by 14 OFDM symbols, and there are arranged, in these 14 OFDM symbols, known reference symbols (pilot signal which will be refereed to as RS hereinafter) used for propagation path estimation for performing data demodulation and the reception quality information and the uplink data having the numbers different from each other in the transmission forms 1 and the transmission form 2.

In the transmission form 1, there are arranged the reception quality information at the 2nd, 6-th, 9-th, and 13-th OFDM symbols and the uplink data at 3-rd, 4-th, 7-th, 10-th, 11-th and 14-th OFDM symbols. In the transmission form 2, there are arranged the reception quality information at 2nd, 4-th, 6-th, 9-th, 11-th and 13-th OFDM symbols and the uplink data at 3-rd, 7-th, 10-th and 14-th OFDM symbols.

The L1/L2 grant including the simultaneous transmission permission information is transmitted from the base station apparatus. The mobile station apparatus having received the signal simultaneously transmits, to the base station apparatus, the uplink data and the reception quality information in transmission form as indicated by the transmission form 1 or the transmission form 2.

The base station apparatus can specify by a RRC signaling (radio resource control signal) the physical format of the uplink data and the reception quality information the mobile station apparatus simultaneously transmits. For example, the base station apparatus sets ratio of the uplink data and the reception quality information for each OFDM symbol unit, and makes a setting in detail of the transmission form 1 or the transmission form 2 etc. For example, for transmission data of 14 OFDM symbols, there may be employed an approach to transmit information that the reception quality information is included in 4 OFDM symbols, or information that the uplink data is included in 6 OFDM symbols. Further, there may be employed an approach to simply notify transmission form selected from transmission forms determined in advance. In addition, there may be employed an approach to specify, in advance by the RRC signaling, a modulation scheme and a coding scheme for coding the reception quality information.

Further, arrangement of the RS, the uplink data and the reception quality information is changed in the time axis direction (14 OFDM) between the transmission forms 1 and the transmission forms 2 in FIG. 4, but such arrangement may be changed with respect to the frequency axis direction. In addition such arrangement may be automatically changed depending on the size of resource of PUSCH assigned by the L1/L2 grant. For example, only the resource unit (minimum unit of time frequency block of PUSCH) arranged in a low frequency band can transmit the reception quality information, and the resource unit arranged in the remaining high frequency band can transmit only the uplink data. Also a modulation scheme and a coding scheme for coding the reception quality information may be changed according to a modulation scheme and a coding scheme of PUSCH specified by the L1/L2 grant.

The mobile station apparatus stores the physical format specified by the RRC signaling from the base station apparatus. In case that the L1/L2 grant including the simultaneous transmission permission signal is transmitted from the base station apparatus, the mobile station apparatus simultaneously transmits the uplink data and the reception quality information in the physical format (e.g., format such that 4 OFDM symbols are used for the reception quality information and 6 OFDM symbols are used for the uplink data as indicated by the transmission form 1 in FIG. 4).

Here, there may be employed as information included in the RRC signaling with respect to the physical format for simultaneous transmission, any information such that the mobile station apparatus determines the ratio in simultaneously transmitting the uplink data and the reception quality information, such as, for example index given to plural kinds of physical format determined in advance, the number of OFDM symbols in which the uplink data is included (e.g., 6 OFDM for the uplink data in 14 OFDM), or the number of OFDM symbols in which the reception quality information is included (e.g., 4 OFDM for the reception quality information in 14 OFDM) etc.

Further, while two kinds of forms as shown in FIG. 4 as described as an example of transmission form, there may be employed any arrangement other than the above as arrangement of the RS, the uplink data and the reception quality information. In addition, there may be included information, e.g., ACK/NACK signal other than the RS, the uplink data and the reception quality information within OFDM signal to be transmitted.

Figure 5:
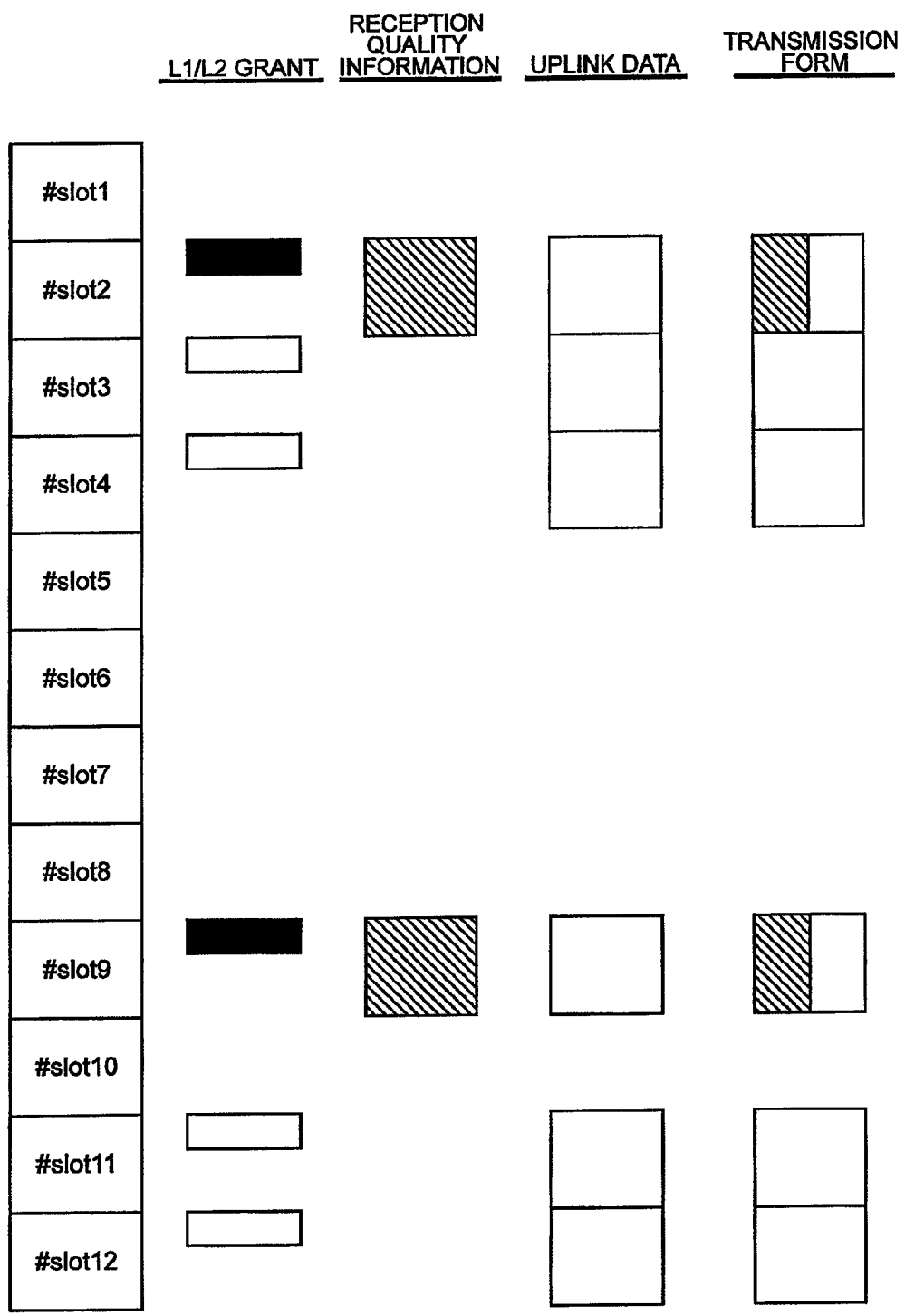
FIG. 5 is a view showing content and form transmitted in the slot in the first embodiment according the present invention.
Figure 6:
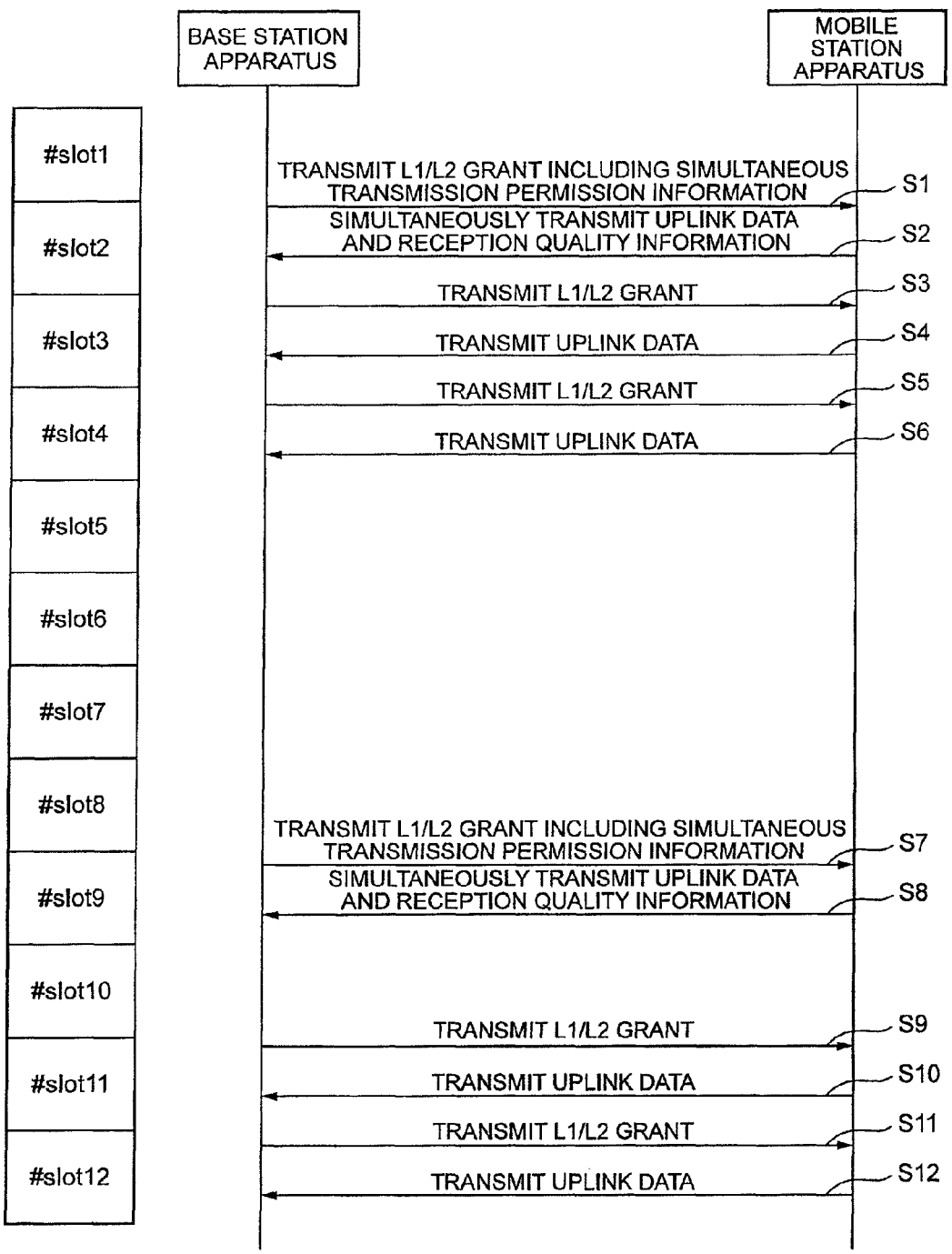
FIG. 6 is a sequence chart showing the operation of the first embodiment according to the present invention.

FIG. 5 is a view showing content and form to be transmitted in the slot in the first embodiment according to the present invention. FIG. 6 is a sequence chart showing the operation of the first embodiment according to the present invention. In this example, for clarifying, there are shown slots and the sequence corresponding to #slot1 to #slot12 in FIG. 3. In addition, the uplink may be referred to as "uplink" and the downlink may be referred to as "downlink" hereinafter.

In FIG. 5 and FIG. 6, at #slot2, the base station apparatus transmits, to the mobile station apparatus, the L1/L2 grant including the simultaneous transmission permission information (step S1). The mobile station apparatus having received the signal simultaneously transmits, to the base station apparatus, the uplink data and the reception quality information (step S2). Also at #slot9, similar processing is performed (step S7, S8). At #slot3, the base station apparatus transmits, to the mobile station apparatus, the L1/L2 grant which does not include the simultaneous transmission permission information (step S3). The mobile station apparatus having received the signal transmits the uplink data in the physical format which does not include the reception quality information (step S4). Also at #slot4, #slot11, and #slot12, similar processing is performed (steps S5, S6, S9, S10, S11 and S12).

Figure 7:
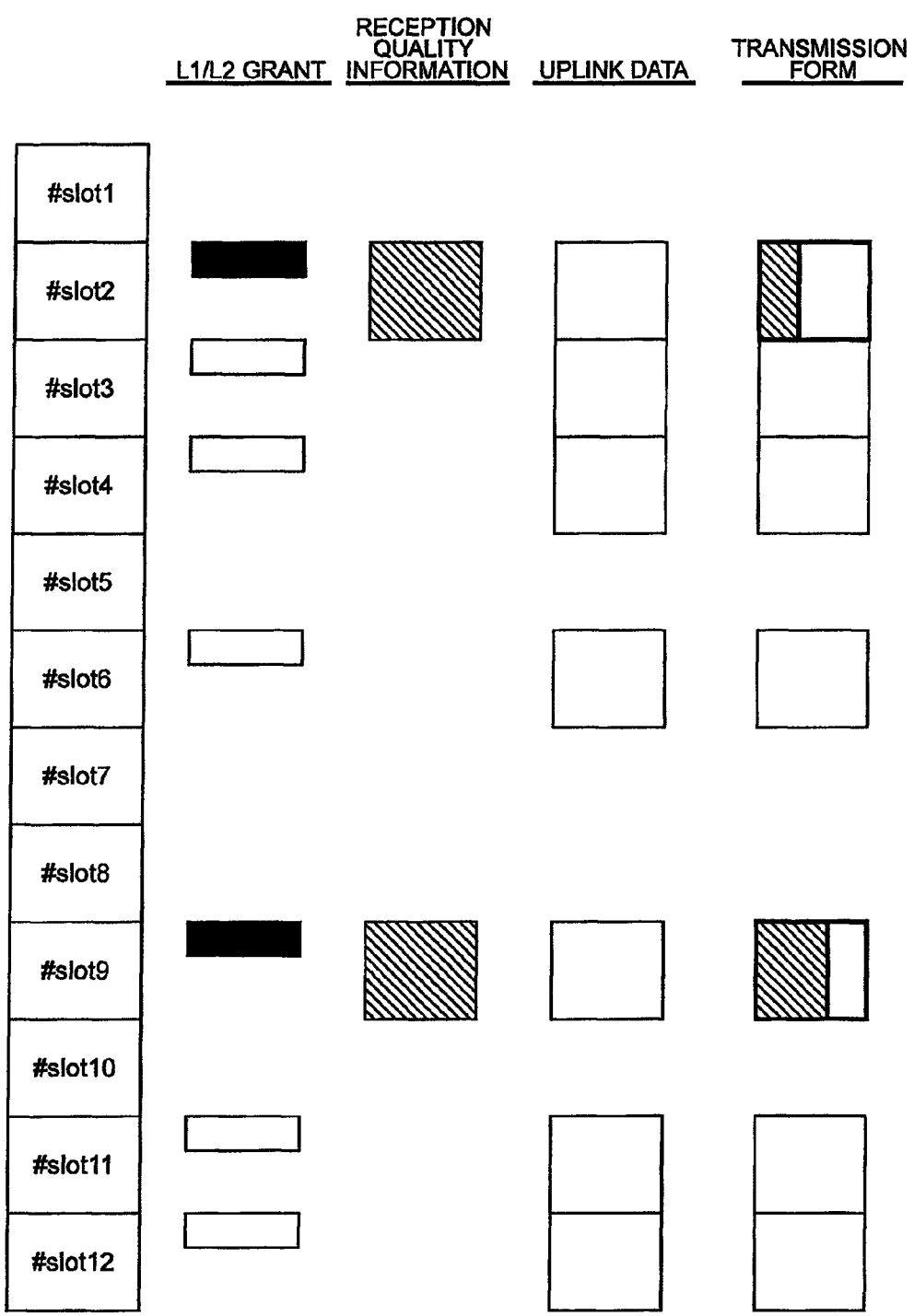
FIG. 7 is a view showing content and form transmitted in the slot when a physical format for simultaneous transmission is specified by RRC signaling from the base station apparatus to the mobile station apparatus in the first embodiment of the present invention.
Figure 8:
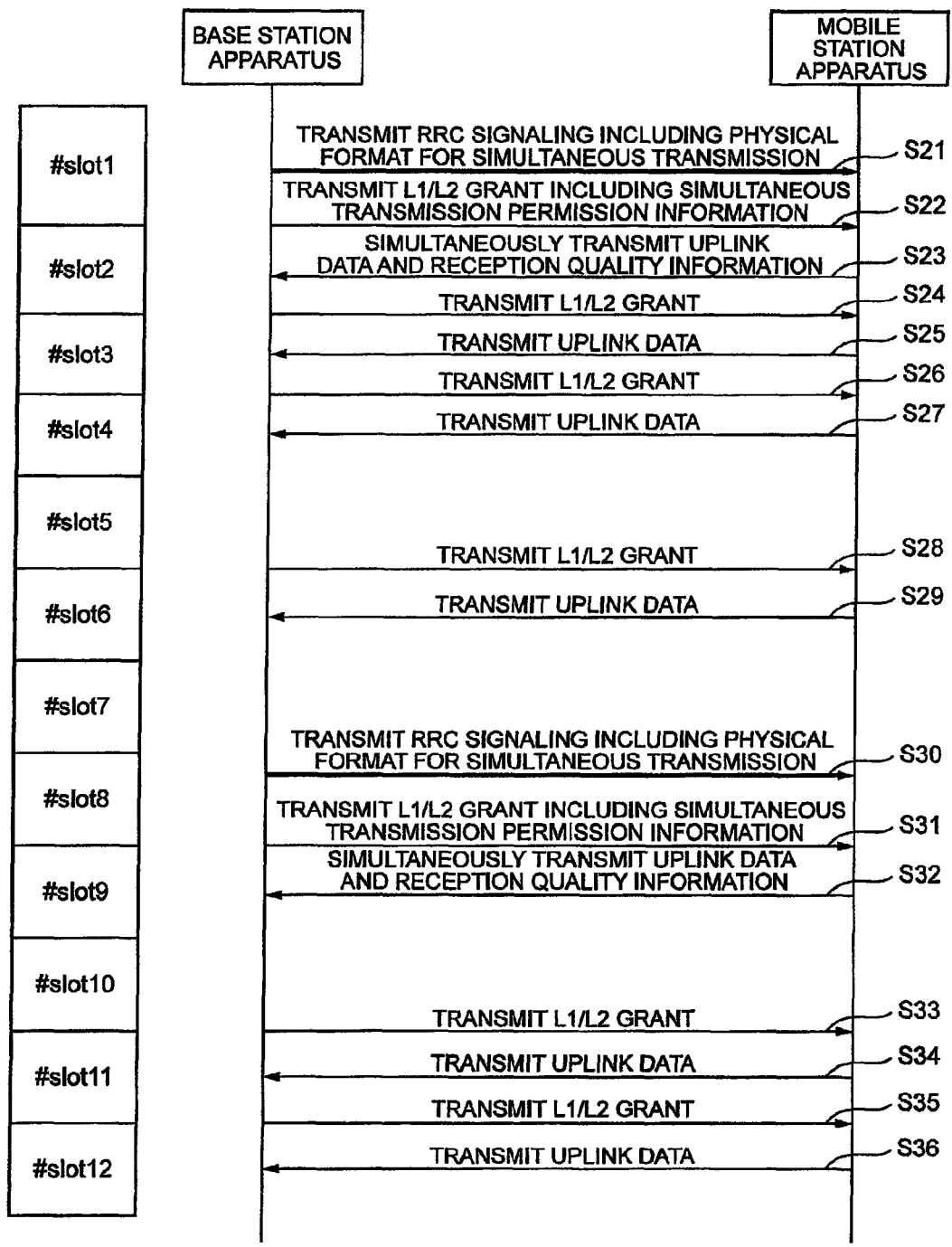
FIG. 8 is a sequence chart of operation when a physical format for simultaneous transmission is specified by RRC signaling from the base station apparatus to the mobile station apparatus in the first embodiment of the present invention.

FIG. 7 is a view showing content and form to be transmitted in the slot when the physical format for simultaneous transmission is specified by the RRC signaling from the base station apparatus to the mobile station apparatus in the first embodiment of the present invention. Moreover, FIG. 8 is a sequence chart showing the operation when the physical format for simultaneous transmission is specified by the RRC signaling from the base station apparatus to the mobile station apparatus in the first embodiment of the present invention. The embodiment shown in FIG. 7 and FIG. 8 differs from the case shown in FIGS. 5 and 6 in that the RRC signaling for specifying the physical format for simultaneous transmission is transmitted from the base station apparatus to the mobile station apparatus at #slot1 and #slot8.

In FIG. 7 and FIG. 8, at #slot1, the base station apparatus transmits, to the mobile station apparatus, the RRC signaling for specifying the physical format for simultaneous transmission (step S21). In this example, it is assumed that the transmission form 1 in FIG. 4 is specified by the RRC signaling. The mobile station apparatus stores the physical format for simultaneous transmission (the transmission form 1). At #slot2, the base station apparatus transmits, to the mobile station apparatus, the L1/L2 grant including the simultaneous transmission permission signal (step S22). The mobile station apparatus having received the signal transmits, to the base station apparatus, the uplink data and the reception quality information in the stored transmission form 1 (step S23).

Next, the base station apparatus transmits, to the mobile station apparatus, the L1/L2 grant which does not include the simultaneous transmission permission signal at #slot3 (step 24). The mobile station apparatus transmits, to the base station apparatus, the uplink data (step S25). Also at #slot4, #slot6, #slot11 and #slot12, similar processing is performed (step S26, S27, S28, S29 and S33 to S36).

At #slot8, the base station apparatus transmits, to the mobile station apparatus, the RRC signaling including specification of the physical format for simultaneous transmission (step S30). Here, it is assumed that the transform form 2 in FIG. 4 is specified by the RRC signaling. The mobile station apparatus stores the physical format for simultaneous transmission (the transmission form 2). At #slot9, the base station apparatus transmits, to the mobile station apparatus, the L1/L2 grant including the simultaneous transmission permission signal (step S31). The mobile station apparatus having received the signal transmits, to the base station apparatus, the uplink data and the reception quality information in the stored transmission form 2 (step S32).

As described above, according to the first embodiment of the present invention, the base station apparatus transmits the L1/L2 grant including the simultaneous transmission permission information for permitting simultaneous transmission of the uplink data and the reception quality information, the mobile station apparatus having received the signal simultaneously transmits the uplink data and the reception quality information, and whereby the base station apparatus can control the transmission frequency of the reception quality information, thus making it possible to perform the transmission control of the reception quality information in consideration of the uplink resource within the cell.

Moreover, since the uplink data and the reception quality information can be simultaneously transmitted, it is possible to reduce wasteful use of the resource of the L1/L2 grant. Namely, when a transmission instruction of the reception quality information is given at a fixed timing using the radio resource control signal (RRC signaling) from the base station apparatus to the mobile station apparatus, if there is a need to give a transmission instruction of the reception quality information dynamically using the uplink data transmission permission signal, it is required to give an instruction at which timing the reception quality information is to be transmitted, using the uplink data transmission permission signal from the base station apparatus to the mobile station apparatus. According to the present invention, since the uplink data transmission permission signal including the simultaneous transmission permission information for instructing the mobile station apparatus to simultaneously transmit the reception quality information and the uplink data is transmitted to the mobile station apparatus, wasteful use of the resource of the uplink data transmission permission signal is reduced in the downlink, and thereby the resource can be effectively utilized.

Further, the base station apparatus transmits the RRC signaling for specifying the physical format for simultaneous transmission in simultaneous transmitting the uplink data and the reception quality information, and thereby the transmission control to flexibly treat the information amount of the reception quality information transmitted from the mobile station apparatus can be performed.

Second Embodiment

Figure 9:
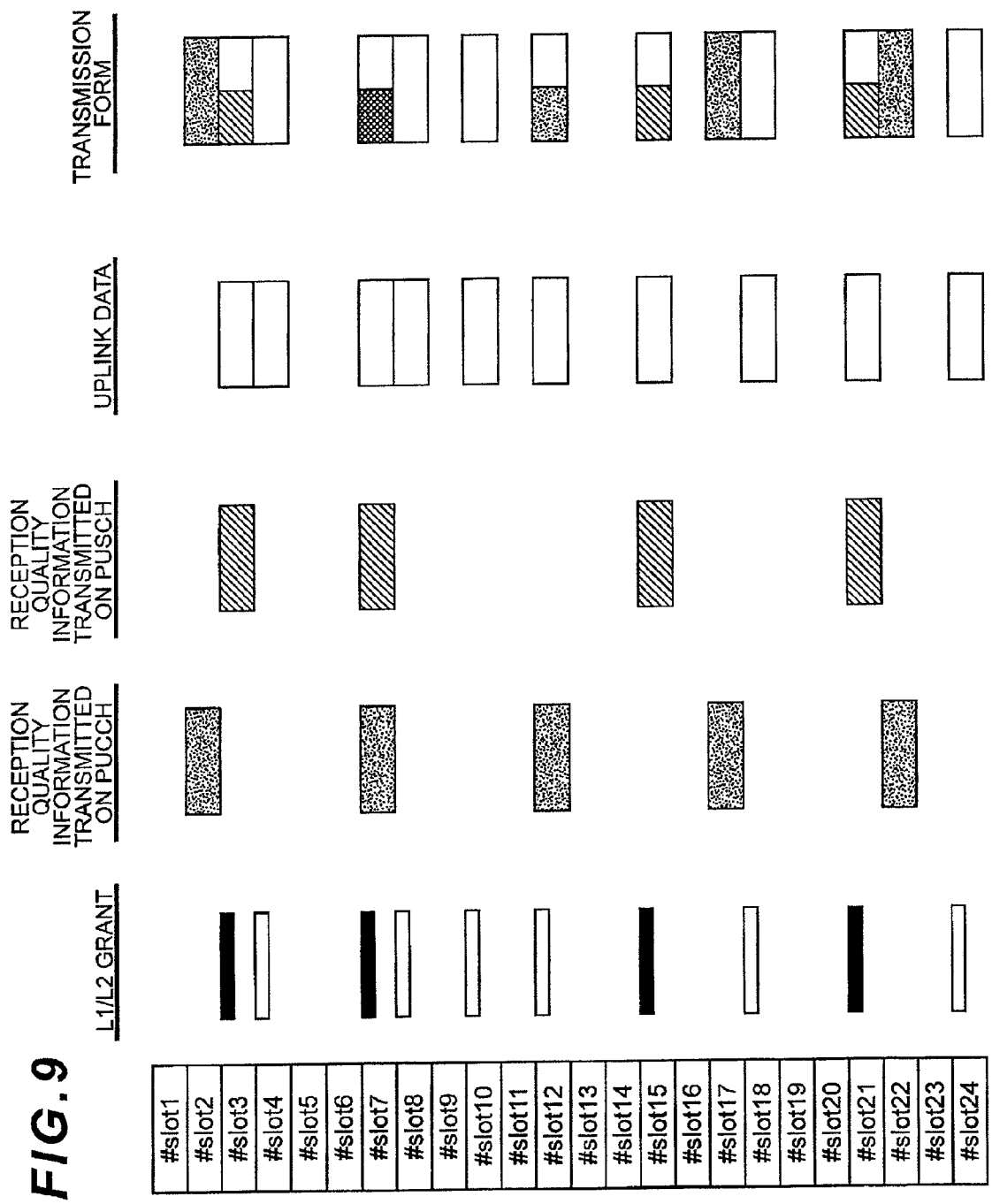
FIG. 9 is a view showing a control signal transmitted from the base station apparatus to the mobile station apparatus, and the reception quality information, the uplink data which are transmitted from the mobile station apparatus to the base station apparatus, and the reception quality information transmission form in a second embodiment according to the present invention.

FIG. 9 is a view showing a control signal transmitted from the base station apparatus to the mobile station apparatus, and the reception quality information, the uplink data which are transmitted from the mobile station apparatus to the base station apparatus, and the reception quality information transmission form in the second embodiment according to the present invention. FIG. 9 shows, as an example, the operation from #slot1 to #slot24.

First, the base station apparatus transmits the RRC signaling which includes resource assignment and transmission interval when the mobile station apparatus transmits the reception quality information using the PUCCH. In general, since the resource region assigned as the PUCCH is smaller than the resource region assigned as the PUSCH, the size of information amount to be transmitted becomes small. Namely, the reception quality information the mobile station apparatus transmits using the PUCCH is the reception quality information having small information amount, and the reception quality information the mobile station apparatus transmits using the PUSCH is the reception quality information having large information amount.

The operation at #slot2 will now be described. The mobile station apparatus in which the resource assignment and the transmission interval in transmitting the reception quality information using the PUCCH are set by the RRC signaling from the base station apparatus, transmits, to the base station apparatus, the reception quality information of small information amount in the set resource of the PUCCH and at the set transmission interval. FIG. 9 shows, the mobile station apparatus transmits the reception quality information using the PUCCH at the transmission interval of five slots.

Next, the operation at #slot3 will be described. At the #slot3, as described in the first embodiment, the base station apparatus transmits, to the mobile station apparatus, the L1/L2 grant including the simultaneous transmission permission information for instructing the mobile station apparatus to simultaneously transmit the uplink data and the reception quality information. The mobile station apparatus having received the L1/L2 grant including the simultaneous transmission permission information from the base station apparatus simultaneously transmits the uplink data and the reception quality information of large information amount using the PUSCH. The transmission form of data transmitted at this time may be controlled by the RRC signaling including the physical format for simultaneous transmission from the base station apparatus similarly to that shown in the first embodiment.

The operation of #slot7 will now be described. The #slot7 indicates the case where at a slot in which is set so as to transmit the reception quality information using the PUCCH in advance, further the base station apparatus transmits the L1/L2 grant including the simultaneous transmission permission information. At #slot7, the mobile station apparatus having received the L1/L2 grant including the simultaneous transmission permission information from the base station apparatus simultaneously transmits, to the base station apparatus, the uplink data and the reception quality information using the PUSCH.

Here, as the reception quality information transmitted simultaneously with the uplink data, there can be transmitted the reception quality information of large information amount, or the reception quality information of small information amount attempting to be transmitted on PUCCH and the reception quality information of large information amount, or the reception quality information of small information amount attempting to be transmitted on PUCCH and the relationship thereof. The reception quality information having small information amount and the relationship thereof indicates the reception quality information having small information amount attempting to be transmitted on PUCCH and difference information with respect to the reception quality information, etc. Specifically, it indicates that with the average value of wideband reception quality information as the reception quality information of small information amount, narrow band reception quality information is expressed as the difference information from the average value thereof and is transmitted. For example, in case that there is a desire to transmit four values of 15, 12, 10 and 8 as the reception quality information, the average value as small information amount is determined to be "9". Moreover, the difference information from the average value as "the relationship thereof" is determined to be 6, 3, 1 and −1. This information is transmitted simultaneously with the uplink data on PUSCH. As stated above, since the difference information of the average value can be expressed by lesser number of bits, it is possible to reduce the number of bits of the reception quality information transmitted on the uplink data channel.

Further, the operation of the base station apparatus at #slot7 will be described. When the mobile station apparatus transmits, to the base station apparatus, the reception quality information of small information amount attempting to be transmitted on PUCCH and the reception quality information of large information amount, or the reception quality information of information amount attempting to be transmitted on PUCCH and the relationship thereof, the resource of the PUCCH which has been set by the RRC signaling in advance does not transmit any information.

The base station apparatus transmits the L1/L2 grant including the simultaneous transmission permission information to thereby recognize in advance that there is no information to be transmitted in the resource of the PUCCH. For this reason, other mobile station apparatus are performed scheduling using the resource so as to transmit information of the uplink (e.g., ACK/NACK signal).

By performing such scheduling, it is possible to use, with respect to other mobile station apparatus, the resource of the PUCCH which has been maintained in advance for transmitting the reception quality information, thus making it possible to more efficiently use the uplink resource.

At #slot12, there is shown the case where at a slot which the base station apparatus set by the RRC signaling for the mobile station apparatus so as to transmit the reception quality information having small information amount using the PUCCH, the base station apparatus transmits the L1/L2 grant which does not include the simultaneous transmission permission information. The operation at the #slot12 will be described. At the #slot12, the mobile station apparatus having received the L1/L2 grant which does not include the simultaneous transmission permission information from the base station apparatus simultaneously transmits, using the PUSCH, the uplink data and the reception quality information of small information attempting to be transmitted on the PUCCH.

At this time, as the physical format for simultaneously transmitting the uplink data and the reception quality information of small information attempting to be transmitted on the PUCCH to be transmitted using the PUSCH, a format determined in advance is used, or such format is controlled by the RRC signaling. Namely, there are defined the physical format for simultaneously transmitting the reception quality information of small information attempting to be transmitted on PUCCH and the uplink data, and the physical format for simultaneously transmitting the reception quality information of large information and the uplink data in case that receiving the L1/L2 grant including the simultaneous transmission permission information.

Also at #slot12, the base station apparatus transmits the L1/L2 grant which does not include the simultaneous transmission permission information to thereby in advance recognized that there is no information to be transmitted in the resource of the PUCCH, other mobile station apparatus are performed scheduling so as to transmit the uplink information, (e.g., ACK/NACK signal) using the resource.

Figure 10:
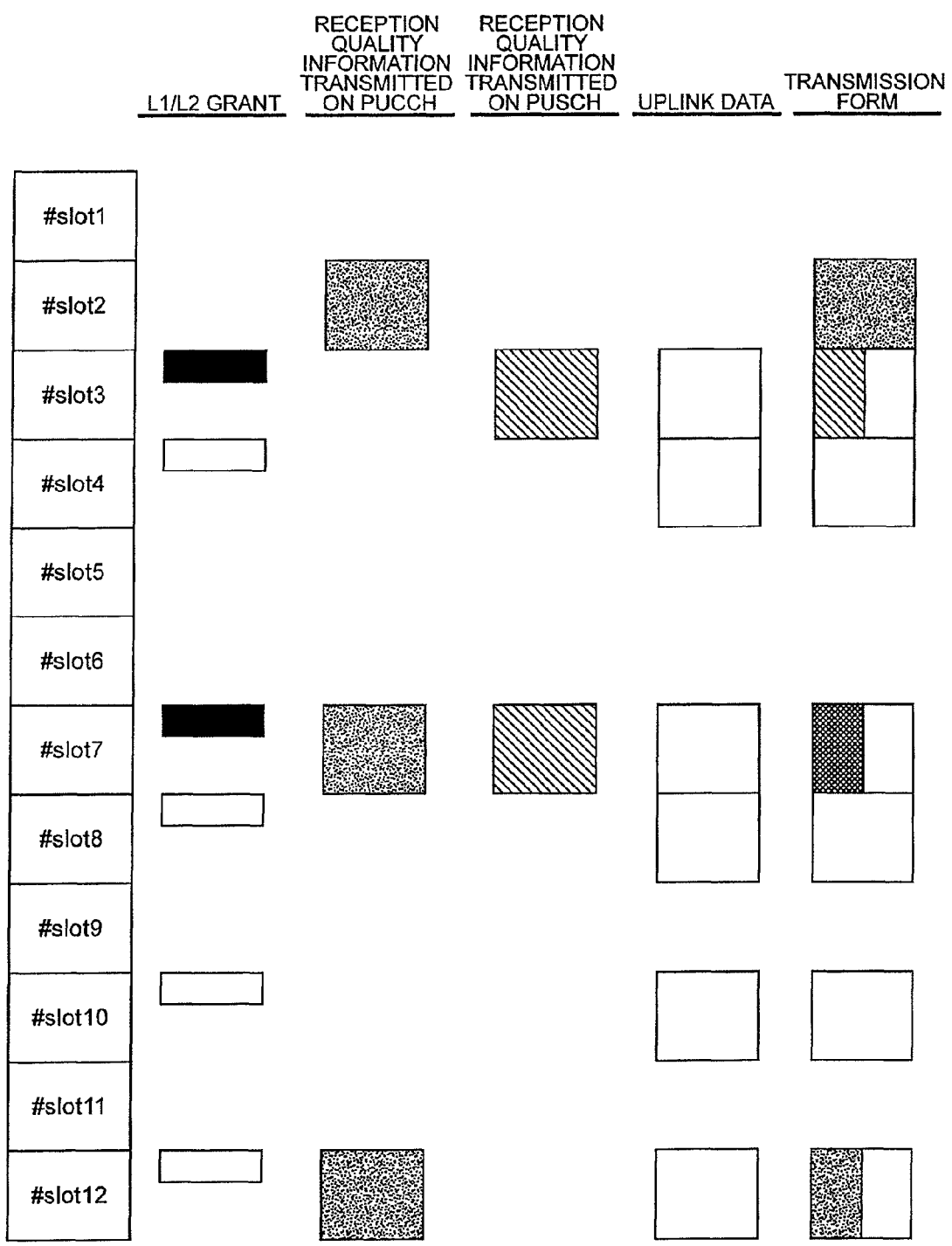
FIG. 10 is a view showing content and form transmitted in the slot in the second embodiment according to the present invention.
Figure 11:
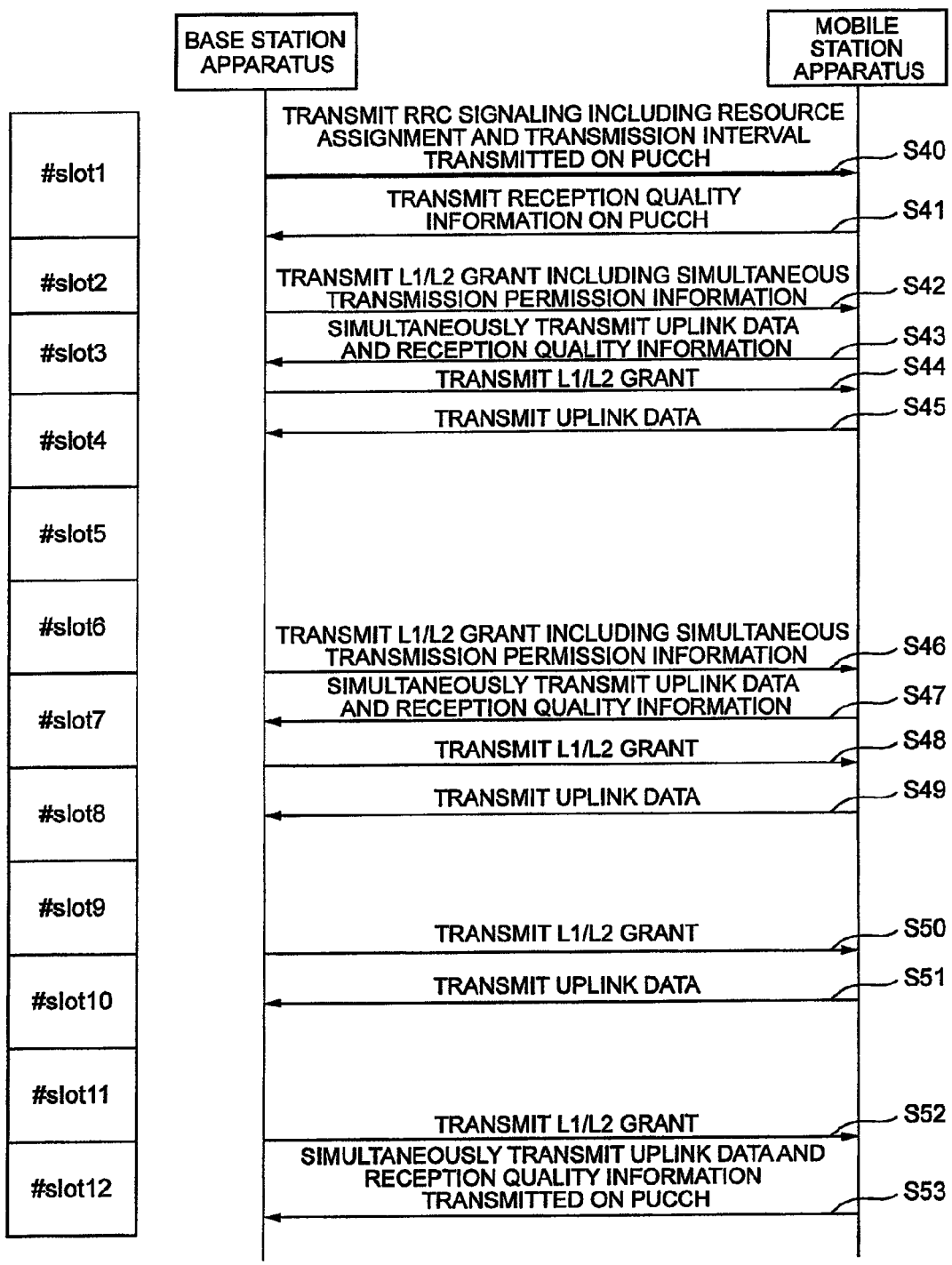
FIG. 11 is a sequence chart showing the operation of the second embodiment according to the present invention.

FIG. 10 is a view showing content and form to be transmitted in the slot in the second embodiment according to the present invention. Moreover, FIG. 11 is a sequence chart showing the operation of the second embodiment according to the present invention. Here, for facilitation of explanation, there are shown slots and the sequence corresponding to #slot1 to #slot12 in FIG. 9. In FIG. 10 and FIG. 11, at #slot1, the resource assignment and the transmission interval when the mobile station apparatus transmits the reception quality information using the PUCCH are set by the RRC signaling from the base station apparatus. At #slot2, the mobile station apparatus transmits the reception quality information of small information amount in the set recourse of the PUCCH and at the set transmission interval (step S41). At #slot3, the base station apparatus transmits the L1/L2 grant including the simultaneous transmission permission information (step S42). The mobile station apparatus having received the signal simultaneously transmits, using the PUSCH, the uplink data and the reception quality information of large information amount (step S43).

At #slot4, the base station apparatus transmits the L1/L2 grant which does not include the simultaneous transmission permission information (step S44). The mobile station apparatus having received the signal transmits, using the PUSCH, the uplink data (step S45). Also at #slots 8 and 10, similar processing is performed (steps S48 to S51).

At #slot7, the base station apparatus transmits the L1/L2 grant including the simultaneous transmission permission information (step S46). The mobile station apparatus having received the signal transmits, using the PUSCH, the uplink data and the reception quality information of large information amount, or the uplink data and the reception quality information of small information amount attempting to be transmitted on PUCCH and the reception quality information of large information amount, or the uplink data and the reception quality information of small information amount attempting to be transmitted on PUCCH and the relationship thereof (step S47). In addition, the base station apparatus performs scheduling so that other mobile station apparatus can transmit the uplink information using such resource.

At #slot12, the base station apparatus transmits the L1/L2 grant which does not include the simultaneous transmission permission information (step S52). The mobile station apparatus having received the signal transmits, using the PUSCH, the uplink data and the reception quality information attempting to be transmitted on PUCCH (step S53). In addition, the base station apparatus performs scheduling so that other mobile station apparatus can transmit the uplink information using such resource.

As stated above, according to the second embodiment of the present invention, the base station apparatus transmits the RRC signaling including the resource and the transmission interval for transmitting the reception quality information using the PUCCH, and transmits the L1/L2 grant including the simultaneous transmission permission information for permitting simultaneous transmission of the uplink data and the reception quality information, thereby enabling control of the transmission frequency of the reception quality information and the transmission control to flexibly treat the information amount of the reception quality information.

Moreover, since the uplink data and the reception quality information can be simultaneously transmitted, it is possible to reduce wasteful use of the resource of the L1/L2 grant. Namely, when a transmission instruction of the reception quality information is given at a fixed timing using the radio resource control signal (RRC signaling) from the base station apparatus to the mobile station apparatus, if there is a need to give a transmission instruction of the reception quality information dynamically using the uplink data transmission permission signal, it is required to give an instruction at which timing the reception quality information is to be transmitted, using the uplink data transmission permission signal from the base station apparatus to the mobile station apparatus. According to the present invention, since the uplink data transmission permission signal including the simultaneous transmission permission information for instructing the mobile station apparatus to simultaneously transmit the reception quality information and the uplink data is transmitted to the mobile station apparatus, wasteful use of the resource of the uplink data transmission permission signal is reduced in the downlink, and thereby the resource can be effectively utilized.

Third Embodiment

Figure 12:
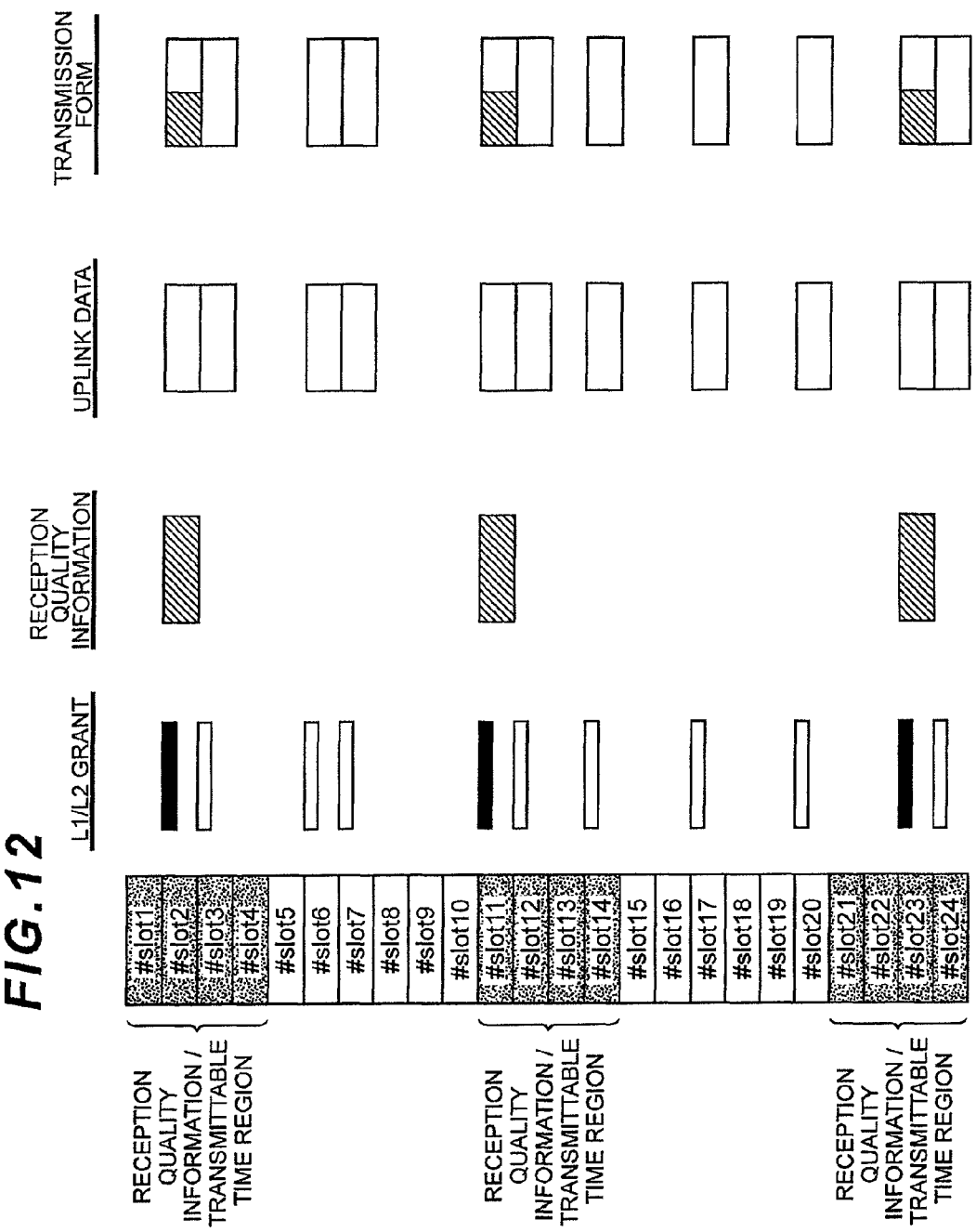
FIG. 12 is a view showing a control signal transmitted from the base station apparatus to the mobile station apparatus, and the reception quality information, the uplink data which are transmitted from the mobile station apparatus to the base station apparatus, and the reception quality information transmission form in a third embodiment according to the present invention.

FIG. 12 is a view showing a control signal transmitted from the base station apparatus to the mobile station apparatus, and the reception quality information, the uplink data which are transmitted from the mobile station apparatus to the base station apparatus, and the reception quality information transmission form. FIG. 12 shows, as an example, the operation from #slot1 to #slot24. First, the base station apparatus transmits, to the mobile station apparatus, the RRC signaling including a reception quality information transmittable time region. This reception quality information transmittable time region is a region where the mobile station apparatus having received the L1/L2 grant at any slot within the region can simultaneously transmit the uplink data and the reception quality information. Thus, there is no necessity to include simultaneous transmission permission information in the L1/L2 grant to be transmitted from the base station apparatus, thus making it possible to more efficiently use downlink resource.

FIG. 12 shows that the reception quality information transmittable time regions are set with respect to slots of #slot1 to #slot4, #slot11 to #slot14 and #slot21 to #slot24 by the RRC signaling from the base station apparatus. Moreover, it shows that the mobile station apparatus simultaneously transmits the uplink data and the reception quality information with respect to the L1/L2 grant (#slot2, #slot11 and #slot23) first received within the reception quality information transmittable time region.

The transmission form when the mobile station apparatus simultaneously transmits the uplink data and the reception quality information is similar to that shown in the first embodiment, and the RRC signaling including the physical format for simultaneous transmission may be transmitted from the base station apparatus.

Figure 13:
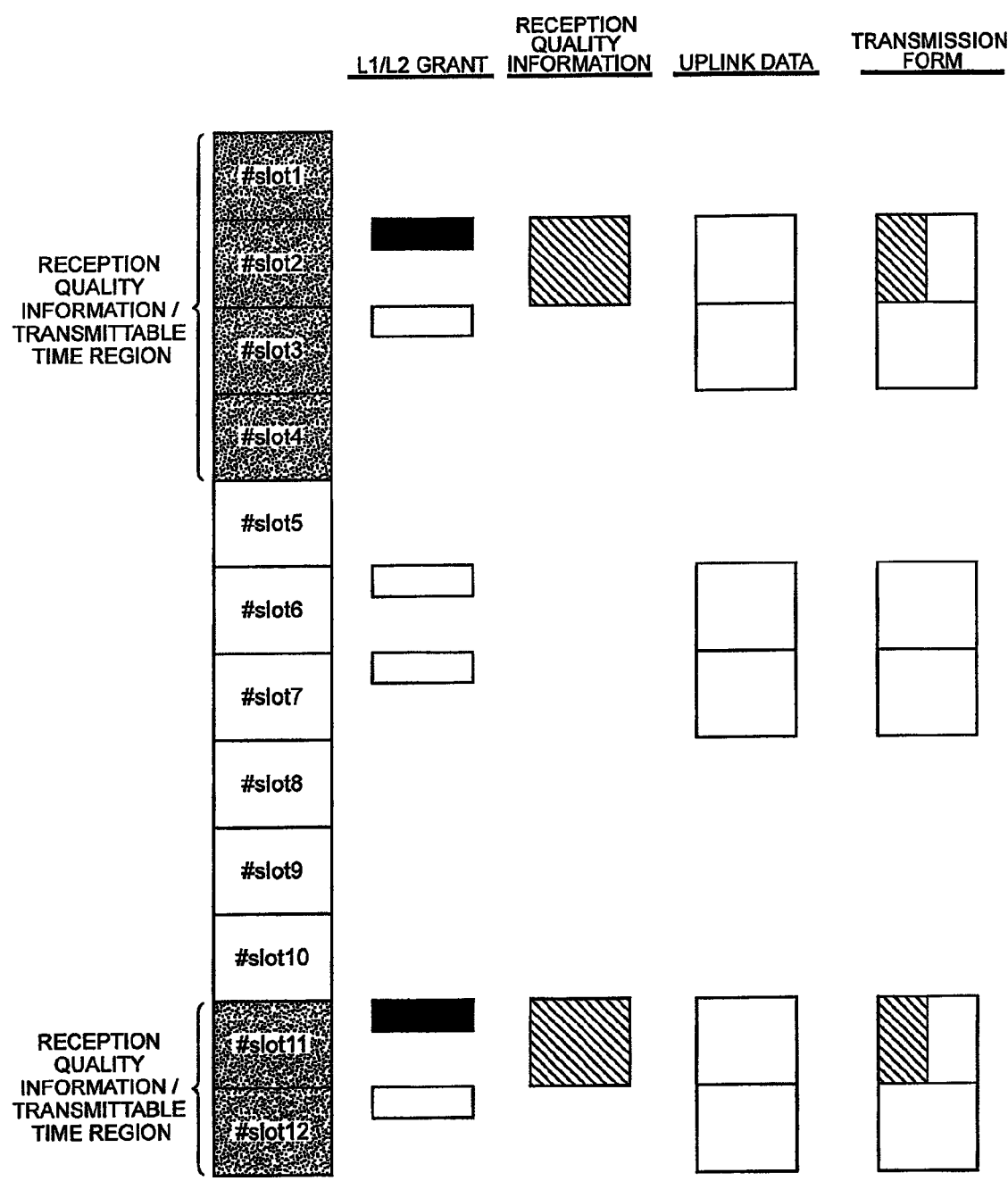
FIG. 13 is a view showing content and form transmitted in the slot in the third embodiment according to the present invention.
Figure 14:
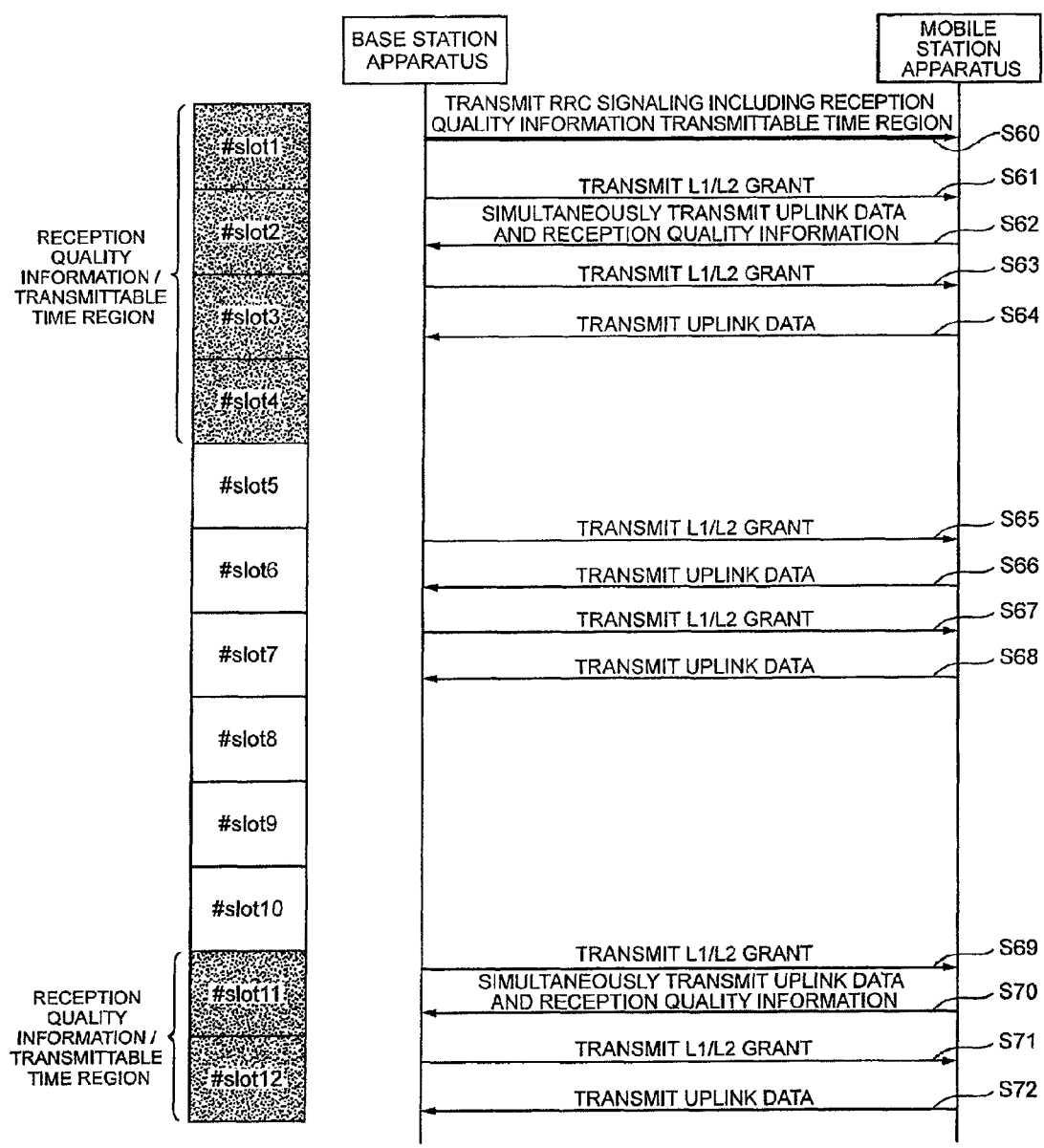
FIG. 14 is a sequence chart showing the operation of the third embodiment according to the present invention.

FIG. 13 is a view showing content and form to be transmitted in the slot in the third embodiment according to the present invention. Moreover, FIG. 14 is a sequence chart showing the operation of the third embodiment according to the present invention. Here, for facilitation of explanation, there are shown slots and the sequence corresponding to #slot1 to #slot12 in FIG. 12.

In FIG. 13 and FIG. 14, at #slot1, the base station apparatus transmits, to the mobile station apparatus, the RRC signaling including the reception quality information transmittable time region (step S60). The mobile station apparatus having received an L1/L2 grant at any slot within the time region (step S61) simultaneously transmits the uplink data and the reception quality information (step S62). Also at #slot11, similar processing is performed (steps S69, S70). At #slot3, the mobile station apparatus having received the L1/L2 grant (step S63) transmits the uplink data (step S64).

In this example, since it shows that the uplink data and the reception quality information are simultaneously transmitted with respect to the L1/L2 grant first received with the reception quality information transmittable time region, simultaneous transmission is not performed at #slot3. Also at #slot6, #slot7 and #slot12, similar processing is performed (steps S65 to S68, S71 and S72).

In the third embodiment of the present invention, for facilitation of explanation description has been given in connection with the example where the uplink data and the reception quality information are simultaneously transmitted with respect to the L1/L2 grant first received within the reception quality information transmittable time region. However, the reception quality information may be transmitted at any slot within the reception quality information transmittable time region.

As described above, according to the third embodiment of the present invention, the base station apparatus transmits, to the mobile station apparatus, the RRC signaling that includes the reception quality information transmittable time region, and the mobile station apparatus having received the L1/L2 grant within the time region simultaneously transmits the uplink data and the reception quality information. Thus, the base station apparatus can control the transmission frequency of the reception quality information and can perform the transmission control which flexibly treats the information amount of the reception quality information. Further, the uplink data and the reception quality information can be simultaneously transmitted, which leads to reduction in wasteful use of the resource of the L1/L2 grant.

Moreover, it is possible to perform, more efficiently, the transmission control of the reception quality information without adding information to the L1/L2 grant to be transmitted from the base station apparatus to the mobile station apparatus. Namely, when a transmission instruction of the reception quality information is given at fixed timing using the radio resource control signal (RRC signaling) from the base station apparatus to the mobile station apparatus, if there is a need to give a transmission instruction of the reception quality information dynamically using the uplink data transmission permission signal, it is required to give an instruction at which timing the reception quality information is to be transmitted, using the uplink data transmission permission signal from the base station apparatus to the mobile station apparatus. According to the present invention, since the uplink data transmission permission signal including the simultaneous transmission permission information for instructing the mobile station apparatus to simultaneously transmit the reception quality information and the uplink data is transmitted to the mobile station apparatus, wasteful use of the resource of the uplink data transmission permission signal is reduced, and thereby the resource can be effectively utilized.

Fourth Embodiment

Figure 15:
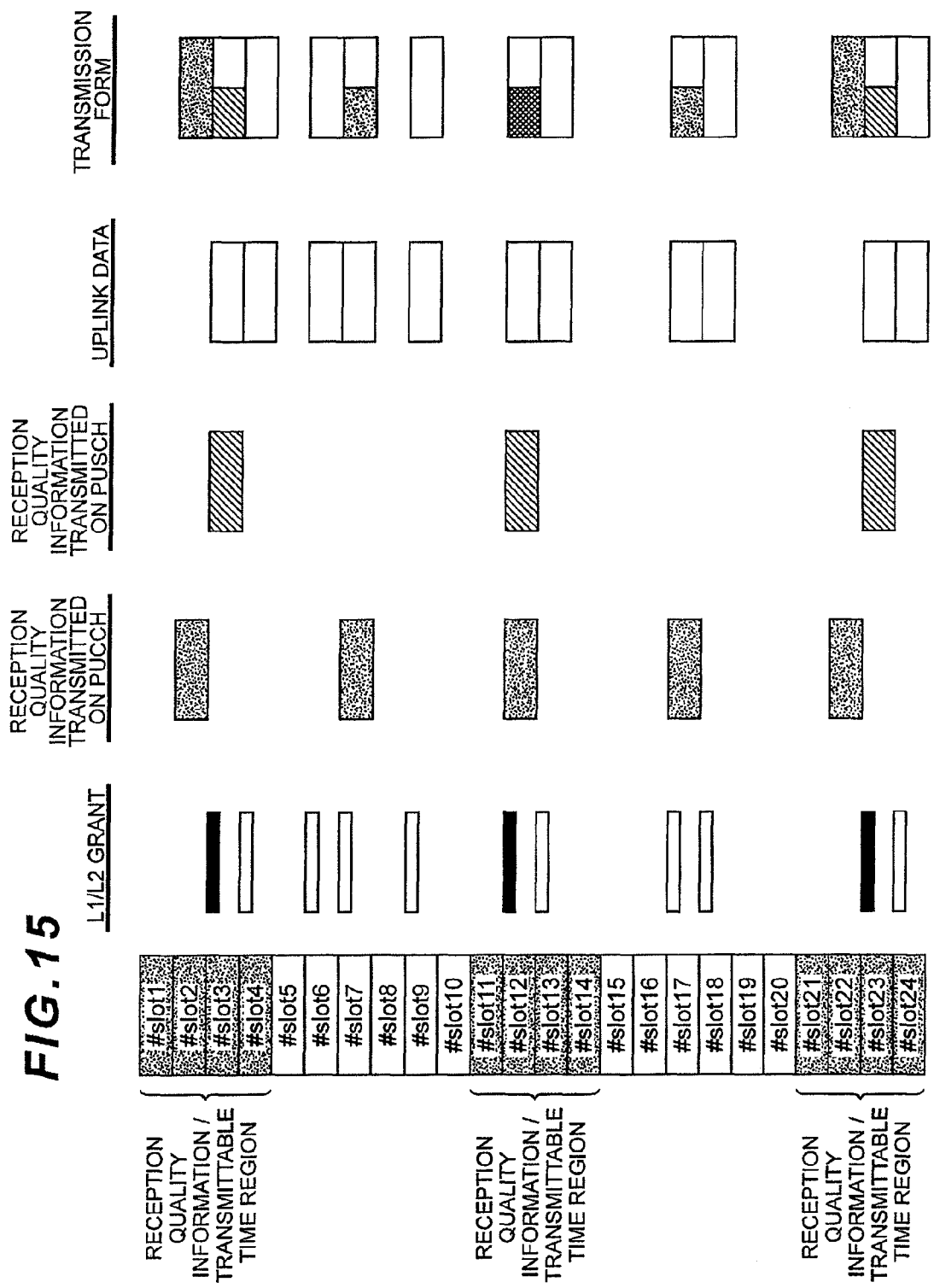
FIG. 15 is a view showing a control signal transmitted from the base station apparatus to the mobile station apparatus, and the reception quality information, the uplink data which are transmitted from the mobile station apparatus to the base station apparatus, and the reception quality information transmission form in a fourth embodiment according to the present invention.

FIG. 15 is a view showing a control signal transmitted from the base station apparatus to the mobile station apparatus, and the reception quality information, the uplink data which are transmitted from the mobile station apparatus to the base station apparatus, and reception quality information transmission form in the fourth embodiment of the present invention. In FIG. 15, as an example, there is shown an operation from #slot1 to #slot24. First, the base station apparatus transmits, to the mobile station apparatus, the RRC signaling which includes the resource assignment and the transmission interval when the mobile station apparatus transmits the reception quality information using the PUCCH, and the reception quality information transmittable time region.

In FIG. 15, it shows that the reception quality information is transmitted using the PUCCH at the transmission interval of five slots, and to set reception quality information transmittable time region at #slot1 to #slot4, #slot11 to #slot14 and #slot21 to #slot24. Moreover, it shows that the mobile station apparatus simultaneously transmits the uplink data and the reception quality information with respect to the L1/L2 grant (#slot3, #slot12, and #slot23) first received within the reception quality information transmittable time region.

At #slot2, the mobile station apparatus in which the resource assignment and the transmission interval in transmitting the reception quality information using the PUCCH are set by the RRC signaling from the base station apparatus transmits, using the PUCCH, the reception quality information of small information amount in the resource of the PUCCH and at the transmission interval determined at that setting.

At #slot3, the mobile station apparatus having received the L1/L2 grant from the base station apparatus simultaneously transmits the uplink data and the reception quality information. While the transmission form in simultaneously transmitting the uplink data and the reception quality information is similar to that shown in the first embodiment, the RRC signaling including the physical format for simultaneous transmission may be transmitted from the base station apparatus.

At #slot7, it is shown that the base station apparatus has transmitted the L1/L2 grant at a slot which is set so as to transmit the reception quality information of small information amount using the PUCCH. At the #slot7, the mobile station apparatus having received the L1/L2 grant from the base station apparatus simultaneously transmits, using the PUSCH, the uplink data and the reception quality information of small information attempting to be transmitted on PUCCH. At this time, as described in the second embodiment, the base station apparatus transmits the L1/L2 grant to thereby recognize in advance that there is no information to be transmitted by the resource of the PUCCH, other mobile station apparatus are performed scheduling so as to transmit the uplink information (e.g., ACK/NACK signal) using the resource.

At #slot12, it is shown that the L1/L2 grant is transmitted within the reception quality information transmittable time region at the slot which is set so as to transmit the reception quality information of small information amount using the PUCCH. At the #slot12, the mobile station apparatus having received the L1/L2 grant from the base station apparatus simultaneously transmits, using the PUSCH, the uplink data and the reception quality information. Here, as the reception quality information transmitted simultaneously with the uplink data, as described in the second embodiment, it is possible to transmit the reception quality information of large information amount, the reception quality information of small information amount and the reception quality information of large information amount attempting to be transmitted on PUCCH, or the reception quality information of small information amount attempting to be transmitted on PUCCH and the relationship thereof.

Figure 16:
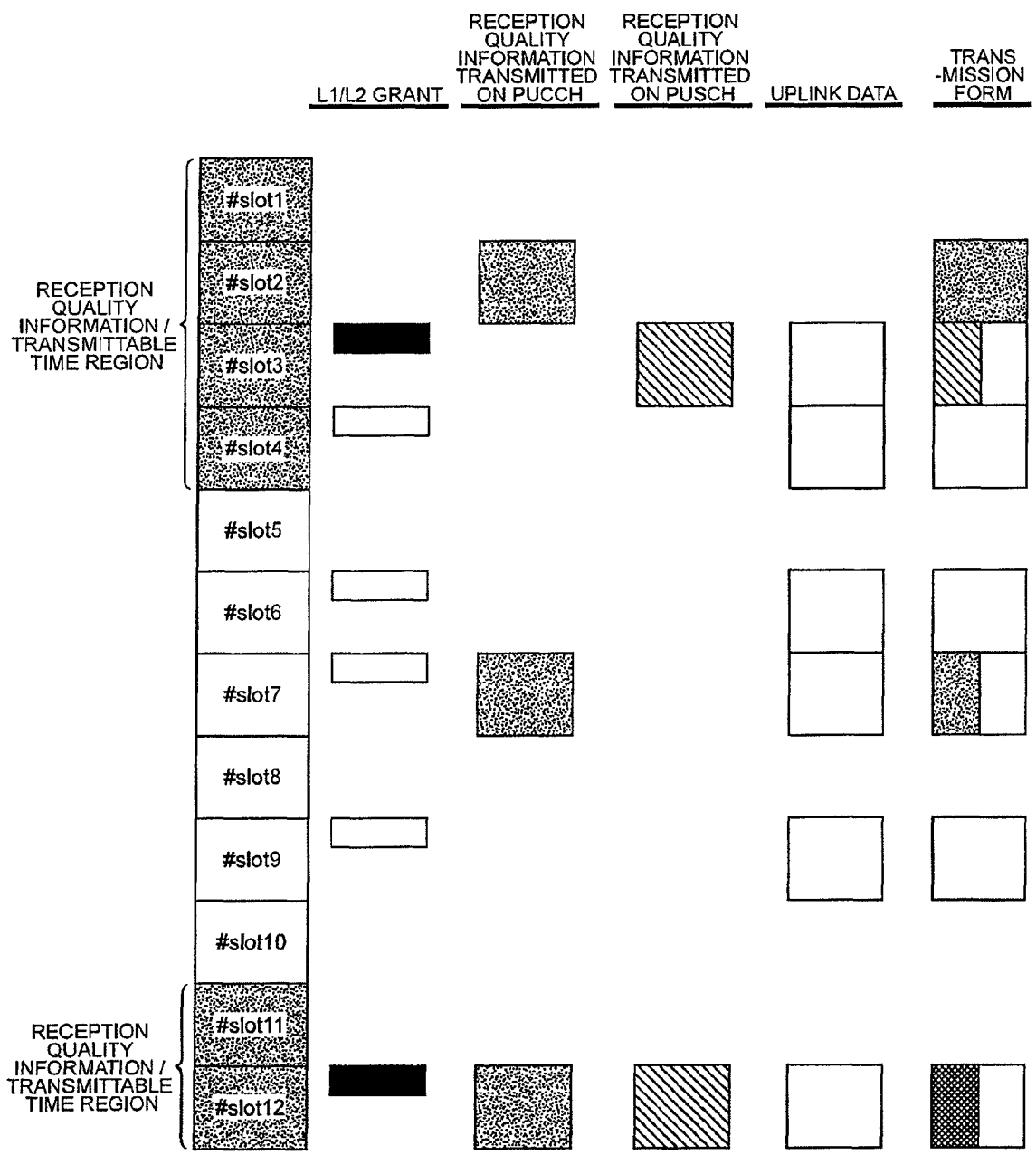
FIG. 16 is a view showing content and form transmitted in the slot in the fourth embodiment according to the present invention.
Figure 17:
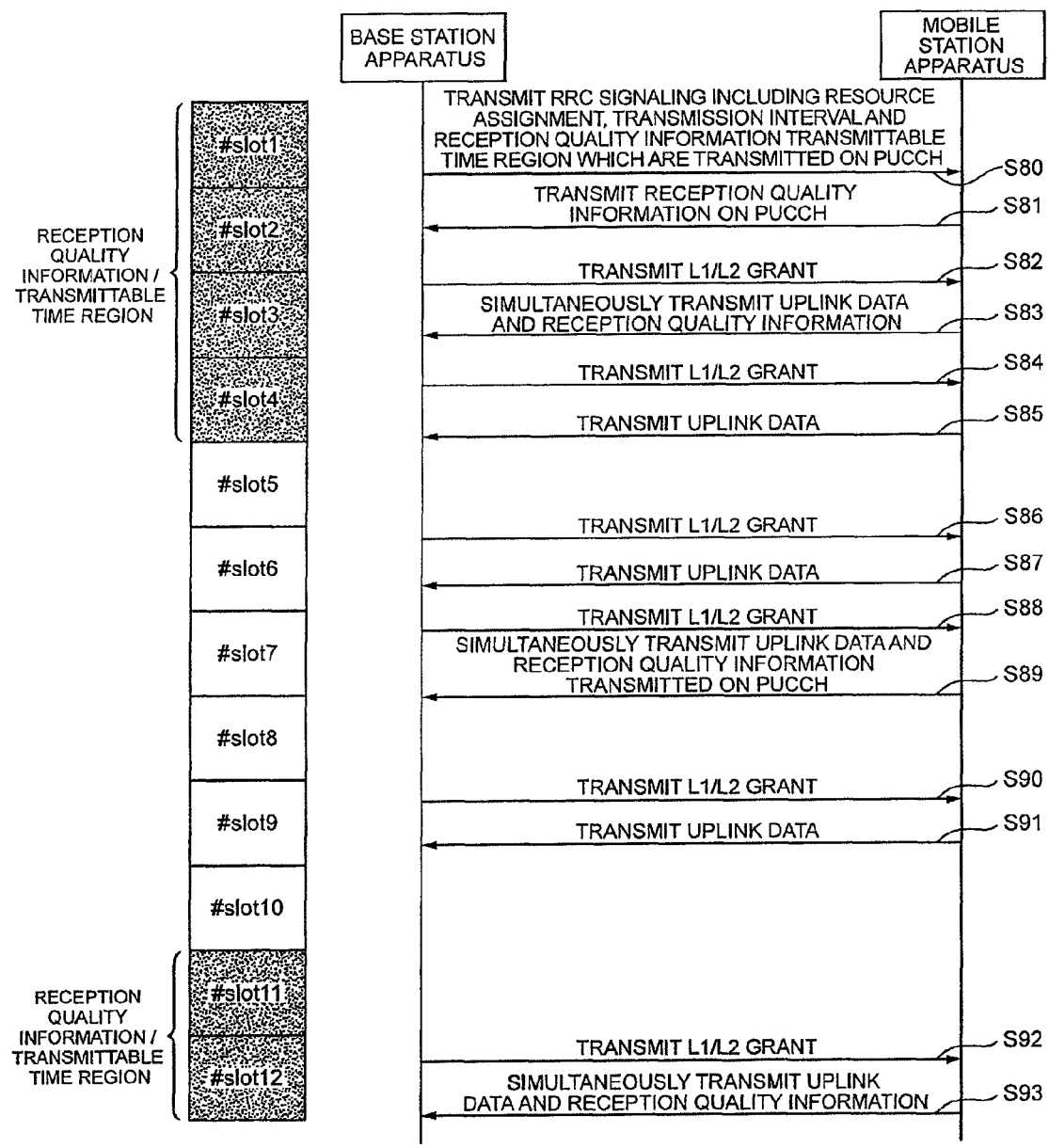
FIG. 17 is a sequence chart showing the operation of the fourth embodiment according to the present invention.
Figure 18:
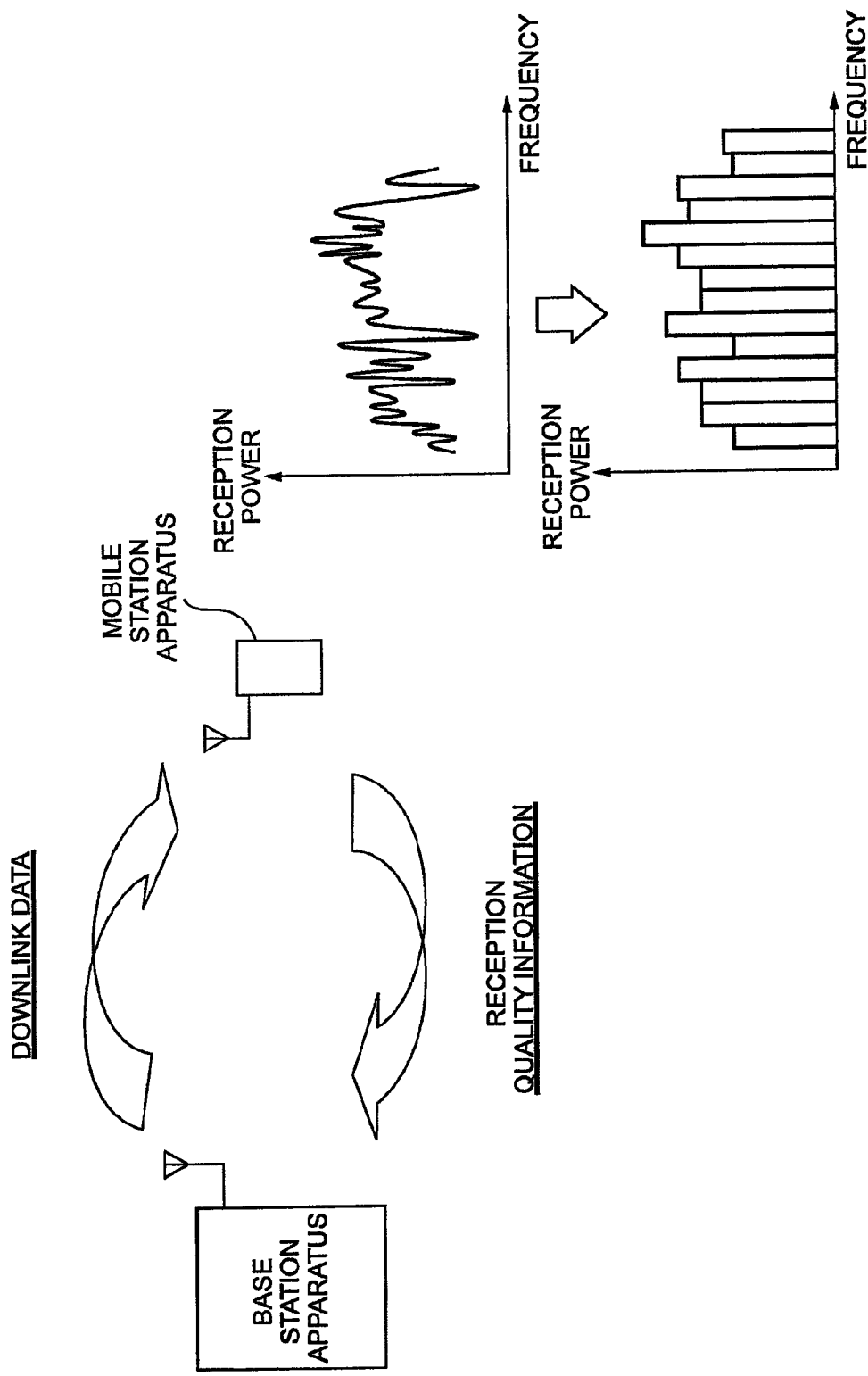
FIG. 18 is a view for explaining a communication method between the base station apparatus and the mobile station apparatus.

FIG. 16 is a view showing content and form to be transmitted in the slot in the fourth embodiment according to the present invention. Moreover, FIG. 17 is a sequence chart showing the operation of the fourth embodiment according to the present invention. Here, for facilitation of explanation, there are shown slots and the sequence corresponding to #slot1 to #slot12 in FIG. 15.

In FIG. 16 and FIG. 17, at #slot1, the base station apparatus transmits the RRC signaling which includes the resource assignment and the transmission interval in transmitting the reception quality information using the PUCCH, and the reception quality information transmittable time region (step S80). The mobile station apparatus having received the signal transmits the reception quality information of small information amount in the resource of the PUCCH and at the transmission interval determined by the setting (step S81). In addition, in the case of receiving the L1/L2 grant at any slot within the reception quality information transmittable time region (step S82), the uplink data and the reception quality information are simultaneously transmitted (step S83).

At the #slot2, the mobile station apparatus transmits, using the PUCCH, the reception quality information of small information amount. At #slot3, the base station apparatus transmits the L1/L2 grant (step S82). The mobile station apparatus having received the signal simultaneously transmits the uplink data and reception quality information (step S83). At #slot4, the base station apparatus transmits the L1/L2 grant (step S84). The mobile station apparatus having received the signal transmits the uplink data (step S85).

In this example, since it shows that the uplink data and the reception quality information are transmitted simultaneously with respect to the L1/L2 grant received first within the reception quality information transmittable time region, simultaneous transmission is not performed at #slot4. At #slot6 and #slot9 similar processing is performed (steps S86, S87, S90 and S91).

At #slot7, the base station apparatus transmits the L1/L2 grant (step S88) and the mobile station apparatus having received the signal transmits, using the PUSCH, the uplink data and the reception quality information of small information amount attempting to be transmitted on the PUCCH (step S89). In addition, the base station apparatus performs scheduling so that other mobile station apparatus can transmit the uplink information using such resource.

At #slot 12, the base station apparatus transmits the L1/L2 grant (step S92) and the mobile station apparatus having received the signal transmits the uplink data and the reception quality information having large information amount, or the uplink data and the reception quality information of small information amount and the reception quality information of large information amount attempting to be transmitted on PUCCH, or the uplink data and the reception quality information of small information amount attempting to be transmitted on PUCCH and the relationship thereof (step S93).

In the fourth embodiment, for facilitation of explanation, description has been given in connection with the example to simultaneously transmit the uplink data and the reception quality information with respect to the L1/L2 grant first received within the reception quality information transmittable time region. However, the reception quality information can be transmitted at any slot within the reception quality information transmittable time region.

As described above, according to the fourth embodiment of the present invention, the base station apparatus transmits, to the mobile station apparatus, the RRC signaling including the resource assignment, the transmission interval when the mobile station apparatus transmits the reception quality information using the PUCCH, and the reception quality information transmittable time region. The mobile station apparatus having received the L1/L2 grant within the time region simultaneously transmits the uplink data and the reception quality information so that the base station apparatus can control the transmission frequency of the reception quality information, and can perform the transmission control which flexibly treats the information amount of the reception quality information.

Further, the uplink data and the reception quality information can be transmitted simultaneously, which leads to reduction of wasteful use of the resource of the L1/L2 grant. Namely, when a transmission instruction of the reception quality information is given at a fixed timing using the radio resource control signal (RRC signaling) from the base station apparatus to the mobile station apparatus, if there is a need to give a transmission instruction of the reception quality information dynamically using the uplink data transmission permission signal, it is required to give an instruction at which timing the reception quality information is to be transmitted, using the uplink data transmission permission signal from the base station apparatus to the mobile station apparatus. According to the present invention, since the uplink data transmission permission signal including the simultaneous transmission permission information for instructing the mobile station apparatus to simultaneously transmit the reception quality information and the uplink data is transmitted to the mobile station apparatus, wasteful use of the resource of the uplink data transmission permission signal is reduced in the downlink, and thereby the resource can be effectively utilized.

In addition, it is possible to perform more efficiently transmission control of the reception quality information without adding information to the L1/L2 grant to be transmitted from the base station apparatus to the mobile apparatus.

While the preferred embodiments of the present invention have been described so far in detail with reference to attached drawings, practical configurations are not limited to these embodiments, design etc., within the range not departing from the gist of the present invention may be included within the scope as set forth in patent claims.

As described above, the mobile communication system of the present embodiment is directed to a mobile communication system in which the mobile station apparatus measures reception quality of a signal received from the base station apparatus to transmit reception quality information to the base station apparatus wherein the base station apparatus transmits, to the mobile station apparatus, the uplink data transmission permission signal including the simultaneous transmission permission information for instructing the mobile station apparatus to simultaneously transmit the reception quality information and the uplink data. The mobile station apparatus simultaneously transmits, to the base station apparatus, the reception quality information and the uplink data in case that receiving, from the base station apparatus, the uplink data transmission permission signal including the simultaneous transmission permission information.

As stated above, the base station apparatus transmits, to the mobile station apparatus, the uplink data transmission permission signal including the simultaneous transmission permission information, and the mobile station apparatus simultaneously transmits, to the base station apparatus, the reception quality information and the uplink data in case that receiving, from the base station apparatus, the uplink data transmission permission signal including the simultaneous transmission permission information. Accordingly, the base station apparatus can control the transmission frequency of the reception quality information. Moreover, it is possible to perform the transmission control of the reception quality information in consideration of the uplink resource within a cell. Further, when a transmission instruction of the reception quality information is given at a fixed timing using the radio resource control signal (RRC signaling) from the base station apparatus to the mobile station apparatus, if there is a need to give a transmission instruction of the reception quality information dynamically using the uplink data transmission permission signal, it is required to give an instruction at which timing the reception quality information is to be transmitted, using the uplink data transmission permission signal from the base station apparatus to the mobile station apparatus. According to the present invention, since the uplink data transmission permission signal including the simultaneous transmission permission information for instructing the mobile station apparatus to simultaneously transmit the reception quality information and the uplink data is transmitted to the mobile station apparatus, wasteful use of the resource of the uplink data transmission permission signal is reduced in the downlink, and thereby the resource can be effectively utilized.

Moreover, the mobile communication system of the present embodiment is directed to a mobile communication system in which a mobile station apparatus measures reception quality of a signal received from the base station apparatus to transmit reception quality information to the base station apparatus, wherein the base station apparatus transmits, to the mobile station apparatus, the radio resource control signal including information instructing the resource assignment and the transmission interval of the reception quality information for the mobile station apparatus to transmit the reception quality information to the base station apparatus using the uplink control channel, and then transmits, to the mobile station apparatus, the uplink data transmission permission signal including the simultaneous transmission permission information for instructing the mobile station apparatus to simultaneously transmit the reception quality information and the uplink data. The mobile station apparatus periodically transmits, to the base station apparatus, the reception quality information using the uplink control channel according to the instruction included in the radio resource control signal transmitted from the base station apparatus, and simultaneously transmits, to the base station apparatus, the reception quality information and the uplink data using the uplink data channel in case that receiving, from the base station apparatus, the uplink data transmission permission signal including the simultaneous transmission permission information.

As stated above, the base station apparatus transmits, to the mobile station apparatus, the radio resource control signal including information instructing the resource assignment and the transmission interval of the reception quality information for the mobile station apparatus to transmit the reception quality information to the base station apparatus using the uplink control channel, and then transmits, to the mobile station apparatus, the uplink data transmission permission signal including the simultaneous transmission permission information. Accordingly, it is possible to control the transmission frequency of the reception quality information. Moreover, it is possible to properly use the uplink control channel and the uplink data channel in transmitting the reception quality information. Accordingly, it becomes possible to perform the transmission control which flexibly treats the information amount of the reception quality information. Further, when a transmission instruction of the reception quality information is given at a fixed timing using the radio resource control signal (RRC signaling) from the base station apparatus to the mobile station apparatus, if there is a need to give a transmission instruction of the reception quality information dynamically using the uplink data transmission permission signal, it is required to give an instruction at which timing the reception quality information is to be transmitted, using the uplink data transmission permission signal from the base station apparatus to the mobile station apparatus. According to the present invention, since the uplink data transmission permission signal including the simultaneous transmission permission information for instructing the mobile station apparatus to simultaneously transmit the reception quality information and the uplink data is transmitted to the mobile station apparatus, wasteful use of the resource of the uplink data transmission permission signal is reduced in the downlink, and thereby the resource can be effectively utilized.

Moreover, in the mobile communication system of the present embodiment, in case that the base station apparatus transmits, to the mobile station apparatus, the uplink data transmission permission signal including the simultaneous transmission permission information at a slot of the downlink corresponding to a slot of the uplink in advance instructed by using the radio resource control information for the mobile station apparatus so as to transmit the reception quality information using the uplink control channel, and the mobile station apparatus receives, from the base station apparatus, the uplink data transmission permission signal including the simultaneous transmission permission information, the mobile station apparatus simultaneously transmits, to the base station apparatus, the reception quality information and the uplink data using the uplink data channel.

As stated above, the mobile station apparatus periodically transmits, to the base station apparatus, the reception quality information using the uplink control channel at a slot of the uplink that the base station apparatus in advance instructed by using the radio resource control information for the mobile station apparatus so as to transmit the reception quality information using the uplink control channel. At the slot of the downlink corresponding to the slot of the uplink, the base station apparatus transmits, to the mobile station apparatus, the uplink data transmission permission signal including the simultaneous transmission permission information, and in case that the mobile station apparatus receives the uplink data transmission permission signal including the simultaneous transmission permission information, the mobile station apparatus simultaneously transmits, to the base station apparatus, the reception quality information and the uplink data using the uplink data channel. With this configuration, since the base station apparatus transmits the uplink data transmission permission signal including the simultaneous transmission permission information to the mobile station apparatus, it is possible to control the transmission frequency of the reception quality information. Moreover, it is possible to properly use the uplink control channel and the uplink data channel in transmitting the reception quality information. Accordingly, it becomes possible to perform the transmission control which flexibly treats the information amount of the reception quality information. In addition, the mobile station apparatus can simultaneously transmit, to the base station apparatus, the reception quality information and the uplink data using the uplink data channel. Accordingly, the resource of the uplink control channel at that time becomes empty. For this reason the base station apparatus can perform scheduling so that other mobile station apparatus can use the resource of emptied uplink control channel. Thus, it becomes possible to more efficiently use the uplink resource.

Moreover, the mobile communication system of the present embodiment is directed to a mobile communication system in which a mobile station apparatus measures reception quality of a signal received from a base station to transmit the reception quality information to the base station apparatus wherein the base station apparatus transmits, to the mobile station apparatus, the radio resource control signal including information for setting the reception quality information transmittable time during which the mobile station apparatus can simultaneously transmit the reception quality information and the uplink data to the mobile station apparatus. Then, the base station apparatus transmits the uplink data transmission permission signal to the mobile station apparatus, and when the mobile station apparatus receives, from the base station apparatus, the uplink data transmission permission signal within the set reception quality information transmittable time, the mobile station apparatus simultaneously transmits the reception quality information and the uplink data to the base station apparatus.

As stated above, when the base station apparatus transmits the radio resource control signal including information for setting the reception quality information transmittable time to the mobile apparatus and then transmits the uplink data transmission permission signal to the mobile station apparatus, and the mobile station apparatus receives, from the base station apparatus, the uplink data transmission permission signal within the reception quality information transmittable time, since the mobile station apparatus simultaneously transmits the reception quality information and the uplink data to the base station apparatus, the base station apparatus can control the transmission frequency of the reception quality information. Moreover, since there is no need to add the simultaneous transmission permission information which instructs the mobile station apparatus to simultaneously transmit the reception quality information and the uplink data, in the uplink data transmission permission signal transmitted from the base station apparatus to the mobile station apparatus, it is possible to more efficiently perform the transmission control of the reception quality information. Further, when a transmission instruction of the reception quality information is given at a fixed timing using the radio resource control signal (RRC signaling) from the base station apparatus to the mobile station apparatus, if there is a need to give a transmission instruction of the reception quality information dynamically using the uplink data transmission permission signal, it is required to give an instruction at which timing the reception quality information is to be transmitted, using the uplink data transmission permission signal from the base station apparatus to the mobile station apparatus. According to the present invention, since the uplink data transmission permission signal including the simultaneous transmission permission information for instructing the mobile station apparatus to simultaneously transmit the reception quality information and the uplink data is transmitted to the mobile station apparatus, wasteful use of the resource of the uplink data transmission permission signal is reduced in the downlink, and thereby the resource can be effectively utilized.

In addition, the mobile communication system of the present embodiment is directed to a mobile communication system in which a mobile station apparatus measures reception quality of a signal received from the base station apparatus to transmit reception quality information to the base station apparatus, wherein the base station apparatus transmits, to the mobile station apparatus, the radio resource control signal including information instructing the resource assignment and the transmission interval of the reception quality information for the mobile station apparatus to transmit the reception quality information using the uplink control channel, and information for setting the reception quality information transmittable time during which the mobile station apparatus can simultaneously transmit the reception quality information and the uplink data, and then transmits the uplink data transmission permission signal to the mobile station apparatus. The mobile station apparatus periodically transmits, to the base station apparatus, the reception quality information using the uplink control channel according to the instruction included in the radio resource control signal transmitted from the base station apparatus, and simultaneously transmits, to the base station apparatus, the reception quality information and the uplink data using the uplink data channel.

As stated above, the base station apparatus transmits, to the mobile station apparatus, the radio resource control signal including information instructing the resource assignment and the transmission interval of the reception quality information for the mobile station apparatus to transmit the reception quality information using the uplink control channel, and information for setting the reception quality information transmittable time during which the mobile station apparatus can simultaneously transmit the reception quality information and the uplink data, and then transmits the uplink data transmission permission signal to the mobile station apparatus. The mobile station apparatus simultaneously transmits, to the base station apparatus, the reception quality information and the uplink data in case that receiving, from the base station apparatus, the uplink data transmission permission signal within the reception quality information transmittable time. Accordingly, the base station apparatus can control the transmission frequency of the reception quality information. Moreover, it is not required to add the simultaneous transmission permission information for instructing the mobile station apparatus to simultaneously transmit the reception quality information and the uplink data in the uplink data transmission permission signal transmitted from the base station apparatus to the mobile station apparatus. Accordingly, it is possible to more efficiently perform the transmission control of the reception quality information. Further, when a transmission instruction of the reception quality information is given at a fixed timing using the radio resource control signal (RRC signaling) from the base station apparatus to the mobile station apparatus, if there is a need to give a transmission instruction of the reception quality information dynamically using the uplink data transmission permission signal, it is required to give an instruction at which timing the reception quality information is to be transmitted, using the uplink data transmission permission signal from the base station apparatus to the mobile station apparatus. According to the present invention, since the uplink data transmission permission signal including the simultaneous transmission permission information for instructing the mobile station apparatus to simultaneously transmit the reception quality information and the uplink data is transmitted to the mobile station apparatus, wasteful use of the resource of the uplink data transmission permission signal is reduced in the downlink, and thereby the resource can be effectively utilized.

In addition, in the mobile communication system of the present embodiment, in case that the base station apparatus transmits, to the mobile station apparatus, the uplink data transmission permission signal at a slot of the downlink corresponding to a slot of the uplink in advance instructed by using the radio resource control information for the mobile station apparatus so as to transmit the reception quality information using the uplink control channel, and the mobile station apparatus receives, from the base station apparatus, the uplink data transmission permission signal, the mobile station apparatus simultaneously transmits, to the base station apparatus, the reception quality information and the uplink data using the uplink data channel.

As stated above, the mobile station apparatus periodically transmits, to the base station apparatus, the reception quality information using the uplink control channel at a slot of the uplink in advance instructed by using the radio resource control information for the mobile station apparatus so as to transmit reception quality information using the uplink control channel. At the slot of the downlink corresponding to the slot of the uplink, the base station apparatus transmits, to the mobile station apparatus, the uplink data transmission permission signal including the simultaneous transmission permission information, and the mobile station apparatus simultaneously transmits, to the base station apparatus, the reception quality information and the uplink data using the uplink data channel. With this configuration, since the base station apparatus transmits the uplink data transmission permission signal including the simultaneous transmission permission information to the mobile station apparatus, it is possible to control the transmission frequency of the reception quality information. Moreover, since it is possible to properly use the uplink control channel and the uplink data channel in transmitting the reception quality information, it becomes possible to perform the transmission control which flexibly treats the information amount of the reception quality information. Further, since the mobile station apparatus simultaneously transmits, to the base station apparatus, the reception quality information and the uplink data using the uplink data channel, the resource of the uplink control channel at that time becomes empty. For this reason, the base station apparatus can perform scheduling so that other mobile station apparatus can use the resource of empty uplink control channel. Thus, it becomes possible to more efficiently use the uplink resource.

Moreover, in the mobile communication system of the present embodiment, the base station apparatus transmits, to the mobile station apparatus, the radio resource control signal including information for specifying the physical format when the mobile station apparatus simultaneously transmits the reception quality information and the uplink data, and the mobile station apparatus simultaneously transmits, to the base station apparatus, the reception quality information and the uplink data according to the specified physical format.

As stated above, since the base station apparatus transmits, to the mobile station apparatus, the radio resource control signal including information for specifying the physical format when the mobile station apparatus simultaneously transmits the reception quality information and the uplink data, it becomes possible to control, on the base station apparatus side, the physical format when the mobile station apparatus simultaneously transmits the reception quality information and the uplink data.

Further, the base station apparatus of the present embodiment is directed to a base station apparatus for controlling transmission operation of reception quality information with respect to the mobile station apparatus, and includes: a scheduler unit that receives the simultaneous transmission permission information for instructing the mobile station apparatus to simultaneously transmit the reception quality information and the uplink data generated by the mobile station apparatus, and the uplink data transmission permission signal, and performs scheduling to include the simultaneous transmission permission information into the uplink data transmission permission signal; and a transmission unit for transmitting, to the mobile station apparatus, the uplink data transmission permission signal including the simultaneous transmission permission information.

As stated above, since the base station apparatus of the present embodiment transmits the uplink data transmission permission signal including the simultaneous transmission permission information to the mobile station apparatus, it is possible to control the transmission frequency of the reception quality information on the base station apparatus side. Moreover, it becomes possible to perform the transmission control of the reception quality information in consideration of the uplink resource within a cell.

Further, the base station apparatus of the present embodiment is directed to a base station apparatus for controlling the transmission operation of reception quality information with respect to the mobile station apparatus, includes: a scheduler unit that receives information instructing the resource assignment and the transmission interval of the reception quality information for the mobile station apparatus to transmit the reception quality information using the uplink control channel, and the simultaneous transmission permission information for instructing the mobile station apparatus to simultaneously transmit the reception quality information and the uplink data generated by the mobile station apparatus, and the uplink data transmission permission signal, performs scheduling to include information for instructing the resource assignment and the transmission interval of the reception quality information for the mobile station apparatus to the transmit reception quality information using the uplink control channel, into the radio resource control signal, and also performs scheduling to include the simultaneous transmission permission information into the uplink data transmission permission signal; and a transmission unit for transmitting, to the mobile station apparatus, the uplink data transmission permission signal including the simultaneous transmission permission information after transmitting the radio resource control signal to the mobile station apparatus.

As stated above, the base station apparatus of the embodiment transmits, to the mobile station apparatus, the radio resource control signal including information instructing the resource assignment and the transmission interval of the reception quality information for the mobile station apparatus to transmit the reception quality information using the uplink control channel, and thereafter transmits the uplink data transmission permission signal including the simultaneous transmission permission information to the mobile station apparatus. Accordingly, it is possible to control the transmission frequency of the reception quality information. In addition, since it is possible to properly use the uplink control channel and the uplink data channel in transmitting the reception quality information, it becomes possible to perform the transmission control which flexibly treats the information amount of the reception quality information.

In addition, in the base station apparatus of the present embodiment, the scheduler unit performs scheduling for transmitting the uplink data transmission permission signal including the simultaneous transmission permission information to the mobile station apparatus at a slot of the downlink corresponding to a slot of the uplink in advance instructed by using the radio resource control information for the mobile station apparatus so as to transmit reception quality information using the uplink control channel.

As stated above, the base station apparatus of the present embodiments transmits, to the mobile station apparatus, the uplink data transmission permission signal including the simultaneous transmission permission information at a slot of the downlink corresponding to a slot of the uplink. Accordingly, it is possible to control the transmission frequency of the reception quality information. Moreover, since it is possible to properly use the uplink control channel and the uplink data channel in transmitting the reception quality information, it becomes possible to perform the transmission control which flexibly treats the information amount of the reception quality information. Further, since the reception quality information and the uplink data are simultaneously transmitted to the base station apparatus using the uplink data channel with respect to the mobile station apparatus, the resource of the uplink control channel at that time becomes empty. For this reason, the base station apparatus can perform scheduling so that other mobile station apparatus can use the resource of empty uplink control channel. Thus, it is possible to more efficiently use the uplink resource.

In addition, the base station apparatus of the present embodiment is directed to a base station apparatus for controlling transmission operation of reception quality information, and includes: a scheduler unit that receives first information for setting the reception quality information transmittable time during which the mobile station apparatus can simultaneously transmit the reception quality information and the uplink data, and the uplink data transmission permission signal, and performs scheduling to include the information for setting the reception quality information transmittable time into the radio resource control signal; and a transmission unit for transmitting the uplink data transmission permission signal to the mobile station apparatus after transmitting the radio resource control signal.

As stated above, the base station apparatus of the present embodiment transmits the radio resource control signal including information for setting the reception quality information transmittable time to the mobile station apparatus, and thereafter transmits the uplink data transmission permission signal to the mobile station apparatus. Accordingly, it is possible to control the transmission frequency of the reception quality information. Further, since it is not required to add the simultaneous transmission permission information for instructing the mobile station apparatus to simultaneously transmit the reception quality information and the uplink data in the uplink data transmission permission signal transmitted from the base station apparatus to the mobile station apparatus, it is possible to more efficiently perform the transmission control of the reception quality information.

Further, the base station apparatus of this embodiment is directed to a base station apparatus for controlling transmission operation of reception quality information with respect to the mobile station apparatus, and includes: a scheduler unit that receives first information instructing the resource assignment and the transmission interval of the reception quality information for the mobile station apparatus to transmit the reception quality information using the uplink control channel, second information for setting the reception quality information transmittable time during which the mobile station apparatus can simultaneously transmit the reception quality information and the uplink data, and the uplink data transmission permission signal, and performs scheduling to include the first and second information into the radio resource control signal; and a transmission unit for transmitting the uplink data transmission permission signal to the mobile station apparatus after transmitting the radio resource control signal.

As stated above, the base station apparatus of the present embodiment transmits the radio resource control signal including the first and second information to the mobile station apparatus, and thereafter transmits the uplink data transmission permission signal to the mobile station apparatus. Accordingly, it is possible to control the transmission frequency of the reception quality information. Moreover, since it is not required to add the simultaneous transmission permission information for instructing the mobile station apparatus to simultaneously transmit the reception quality information and the uplink data in the uplink data transmission permission signal transmitted from the base station apparatus to the mobile station apparatus. Accordingly, it is possible to more efficiently perform the transmission control of the reception quality information.

Further, in the base station apparatus of the present embodiment, the scheduler unit performs scheduling for transmitting the uplink data transmission permission signal to the mobile station apparatus at a slot of the downlink corresponding to a slot of the uplink in advance instructed by using the radio resource control information for the mobile station apparatus so as to transmit the reception quality information.

According to the base station apparatus of the present embodiment, since the uplink data transmission permission signal including the simultaneous transmission permission information is transmitted to a mobile station apparatus, it is possible to control the transmission frequency of the reception quality information. Moreover, since it is possible to properly use the uplink control channel and the uplink data channel in transmitting the reception quality information, it is possible to perform the transmission control which flexibly treats the information amount of the reception quality information. Further, since the mobile station apparatus simultaneously transmits the reception quality information and the uplink data to the base station apparatus, the resource of the uplink control channel at that time becomes empty. For this reason, the base station apparatus can perform scheduling so that other mobile station apparatus can use the resource of emptied uplink control channel. Thus, it is possible to more efficiently use the uplink resource.

In addition, in the base station apparatus of the present embodiment, the scheduler unit performs scheduling for including into the radio resource control signal, information for specifying the physical format when the mobile station apparatus simultaneously transmits the reception quality information and the uplink data, and the transmission unit transmits, to the mobile station apparatus, the radio resource control signal including information for specifying the physical format.

As stated above, the base station apparatus of the present embodiment transmits, to the mobile station apparatus, the radio resource control signal including information for specifying the physical format when the mobile station apparatus simultaneously transmits the reception quality information and the uplink data. Accordingly, it becomes possible to control, on the base station apparatus side, the physical format when the mobile station apparatus simultaneously transmits the reception quality information and the uplink data.

Moreover, the mobile station apparatus of the present embodiment is directed to a mobile station apparatus that measures reception quality of a signal received from a base station apparatus to transmit reception quality information to the base station apparatus, and includes: a reception unit for receiving, from the base station apparatus, the uplink data transmission permission signal including the simultaneous transmission permission information for giving an instruction to simultaneously transmit the reception quality information and the uplink data; and a transmission unit for simultaneously transmitting, to the base station apparatus, the reception quality information and the uplink data in case that the reception unit receives the uplink data transmission permission signal including the simultaneous transmission permission information.

As stated above, the mobile station apparatus of this embodiment, in case that receiving the uplink data transmission permission signal including the simultaneous transmission permission information from the base station apparatus, simultaneously transmits the reception quality information and the uplink data to the base station apparatus so that the transmission frequency of the reception quality information can be controlled on the base station apparatus side. In addition, it is possible to perform the transmission control of the reception quality information in consideration of the uplink resource within a cell.

Moreover, the mobile station apparatus of the present embodiment is directed to a mobile station apparatus that measures reception quality of a signal received from a base station apparatus to transmit reception quality information to the base station apparatus, and includes: a reception unit for receiving, from the base station apparatus, the radio resource control signal including information instructing the resource assignment and the transmission interval of the reception quality information for transmitting the reception quality information to the base station apparatus using the uplink control channel, and thereafter receiving the uplink data transmission permission signal including the simultaneous transmission permission information for giving an instruction to simultaneously transmit the reception quality information and the uplink data; and a transmission unit for periodically transmitting, to the base station apparatus, the reception quality information using the uplink control channel, according to an instruction included in the radio resource control signal, and for simultaneously transmitting, in case that the reception unit receives, from the base station apparatus, the uplink data transmission permission signal including the simultaneous transmission permission information, the reception quality information and the uplink data using the uplink data channel to the base station apparatus.

As stated above, the mobile station apparatus of the present embodiment, after receiving the radio resource control signal including information instructing the resource assignment and the transmission interval of the reception quality information for transmitting, to the base station apparatus, the reception quality information using the uplink control channel, receives the uplink data transmission permission signal including the simultaneous transmission permission information for giving an instruction to simultaneously transmit the reception quality information and the uplink data. Accordingly, it is possible to control the transmission frequency of the reception quality information on the base station apparatus side. In addition, since it is possible to properly use the uplink control channel and the uplink data channel in transmitting the reception quality information, it is possible to perform the transmission control which flexibly treats the information amount of the reception quality information.

Moreover, in the mobile station apparatus of the present embodiment, the reception unit receives, from the base station apparatus, the uplink data transmission permission signal including the simultaneous transmission permission information at a slot of the downlink corresponding to a slot of the uplink which the base station apparatus in advance instructs by using the radio resource control information so as to transmit the reception quality information using the uplink control channel, the transmission unit simultaneously transmits, to the base station apparatus, the reception quality information and the uplink data using the uplink data channel.

According to the mobile station apparatus of the present embodiment, it is possible to properly use the uplink control channel and the uplink data channel in transmitting the reception quality information. Accordingly, it becomes possible to perform the transmission control which flexibly treats the information amount of the reception quality information. Moreover, since the reception quality information and the uplink data are simultaneously transmitted to the base station apparatus using the uplink data channel, the resource of the uplink control channel at that time becomes empty. For this reason, the base station apparatus can perform scheduling so that other mobile station apparatus can use the resource of empty uplink control channel. Thus, it becomes possible to use the uplink resource more efficiently.

Further, the mobile station apparatus of the present embodiment is directed to a mobile station apparatus that measures reception quality of a signal received from a base station apparatus to transmit reception quality information to the base station apparatus, and includes: a reception unit for receiving, from the base station apparatus, the radio resource control signal including information for setting the reception quality information transmittable time during which the reception quality information and the uplink data can be simultaneously transmitted, and thereafter receiving the uplink data transmission permission signal; and a transmission unit for simultaneously transmitting, to the base station apparatus, the reception quality information and the uplink data.

As states above, the mobile station apparatus of the present embodiment, in case that receiving the uplink data transmission permission signal from the base station apparatus within the reception quality information transmittable time, simultaneously transmits the reception quality information and the uplink data to the base station apparatus. Accordingly, it is possible to control the transmission frequency of the reception quality information on the base station apparatus side. Moreover, with this configuration, there is no necessity to add the simultaneous transmission permission information for instructing the mobile station apparatus to simultaneously transmit the reception quality information and the uplink data in the uplink data transmission permission signal to be transmitted from the base station apparatus to the mobile station apparatus. Accordingly, it is possible to perform more efficiently transmission control of the reception quality information.

In addition, the mobile station apparatus of the present embodiment is directed to a mobile station apparatus that measures reception quality of a signal received from a base station apparatus to transmit reception quality information to the base station apparatus, and includes: a reception unit for receiving the radio resource control signal including information instructing the resource assignment and the transmission interval of the reception quality information for transmitting the reception quality information using the uplink control channel and information for setting the reception quality information transmittable time during which the reception quality information and the uplink data can be simultaneously transmitted, and thereafter receiving the uplink data transmission permission signal; and a transmission unit for periodically transmitting, to the base station apparatus, the reception quality information using the uplink control channel according to the instruction included in the radio resource control signal, and simultaneously transmitting, in case that receiving the uplink data transmission permission signal from the base station apparatus, to the base station apparatus, the reception quality information and the uplink data using the uplink data channel.

As stated above, since the mobile station apparatus of the present embodiment, in case that receiving the uplink data transmission permission signal from a base station apparatus within the reception quality information transmittable time, simultaneously transmits the reception quality information and the uplink data to the base station apparatus, it is possible to control the transmission frequency of the reception quality information on the base station apparatus side. Moreover, since there is no need to add the simultaneous transmission permission information for instructing the mobile station apparatus to simultaneously transmit the reception quality information and the uplink data in the uplink data transmission permission signal transmitted from the base station apparatus to the mobile station apparatus, it is possible to perform more efficiently transmission control of the reception quality information.

Moreover, in the mobile station apparatus of this embodiment, the reception unit receives the uplink data transmission permission signal from the base station apparatus at a slot of the downlink corresponding to a slot of the uplink that the base station apparatus in advance instructs by using the radio resource control information so as to transmit the reception quality information using the uplink control channel, the transmission unit simultaneously transmits, to the base station apparatus, the reception quality information and the uplink data using the uplink data channel.

According to the mobile station apparatus of the present embodiment, it is possible to control the transmission frequency of the reception quality information on the base station apparatus side. Moreover, since it is possible to properly use the uplink control channel and the uplink data channel in transmitting the reception quality information, it becomes possible to perform transmission control which flexibly treats the information amount of the reception quality information in the base station apparatus. Further, since the reception quality information and the uplink data are simultaneously transmitted to the base station apparatus using the uplink data channel, the resource of the uplink control channel at that time becomes empty. For this reason, the base station apparatus can perform scheduling so that other mobile station apparatus can use the resource of empty uplink control channel. Thus, it becomes possible to more efficiently use the uplink resource.

In addition, in the mobile station apparatus of this embodiment, the reception unit receives, from the base station apparatus, the radio resource control signal including information for specifying the physical format in simultaneously transmitting the reception quality information and the uplink data, and the transmission unit simultaneously transmits, to the base station apparatus, the reception quality information and the uplink data according to the specified physical format.

As described above, the mobile station apparatus of the present embodiment, receives the radio resource control signal including information for specifying the physical format in simultaneously transmitting the reception quality information and the uplink data from the base station apparatus. Accordingly, it becomes possible to control, on the base station apparatus side, the physical format in simultaneously transmitting the reception quality information and the uplink data.

The invention claimed is:

1. A mobile communication system in which a mobile station apparatus transmits, to a base station apparatus, uplink data on a physical uplink shared channel assigned by using a physical downlink control channel, the mobile communication system comprising:
the base station apparatus configured to:
transmit, to the mobile station apparatus, a radio resource control signal including first information wherein an amount of resources for reception quality information transmitted together with the uplink data on the physical uplink shared channel is determined based on the first information,
transmit on the physical downlink control channel, to the mobile station apparatus, second information instructing a transmission of the reception quality information on the physical uplink shared channel assigned by using the physical downlink control channel; and
the mobile station apparatus configured to:
transmit, to the base station apparatus, the reception quality information together with the uplink data on the physical uplink shared channel assigned by using the physical downlink control channel in response to the second information being received from the base station apparatus, wherein
the amount of resources for the reception quality information is determined based on the first information.

2. A base station apparatus in a mobile communication system in which a mobile station apparatus transmits, to the base station apparatus, uplink data on a physical uplink shared channel assigned by using a physical downlink control channel, the base station apparatus comprising:
a transmitting unit configured to transmit, to the mobile station apparatus, a radio resource control signal including first information wherein an amount of resources for reception quality information transmitted together with the uplink data on the physical uplink shared channel is determined based on the first information; and
the transmitting unit configured to transmit on the physical downlink control channel, to the mobile station apparatus, second information instructing a transmission of the reception quality information on the physical uplink shared channel assigned by using the physical downlink control channel.

3. A mobile station apparatus in a mobile communication system in which the mobile station apparatus transmits, to a base station apparatus, uplink data on a physical uplink shared channel assigned by using a physical downlink control channel, the mobile station apparatus comprising:

a receiving unit configured to receive, from the base station apparatus, a radio resource control signal including first information wherein an amount of resources for reception quality information transmitted together with the uplink data on the physical uplink shared channel is determined based on the first information, the receiving unit configured to receive on the physical downlink control channel, from the base station apparatus, second information instructing a transmission of the reception quality information on the physical uplink shared channel assigned by using the physical downlink control channel; and a transmitting unit configured to transmit, to the base station apparatus, the reception quality information together with the uplink data on the physical uplink shared channel assigned by using the physical downlink control channel in response to the second information being received from the base station apparatus, the amount of resources for the reception quality information is determined based on the first information received.

4. The mobile communication system according to claim 1, wherein the amount of resources for the reception quality information is determined based on the first information and a size of the physical uplink shared channel assigned by using the physical downlink control channel.

5. The base station apparatus according to claim 2, wherein the reception quality information of which the transmission is instructed by using the second information is transmitted together with the uplink data on the physical uplink shared channel, and the amount of resources for the reception quality information transmitted together with the uplink data on the physical uplink shared channel is determined based on the first information and a size of the physical uplink shared channel assigned by using the physical downlink control channel.

6. The mobile station apparatus according to claim 3, wherein the amount of resources for the reception quality information is determined based on the first information and a size of the physical uplink shared channel assigned by using the physical downlink control channel.

* * * * *